United States Patent [19]

Fujita et al.

[11] Patent Number: 4,767,201
[45] Date of Patent: Aug. 30, 1988

[54] WIDE ANGLE LENS

[75] Inventors: Hisao Fujita, Hino; Tomoko Wakabayashi; Hiroyuki Yamazaki, both of Tokyo, all of Japan

[73] Assignee: Konishiroku Photo Industry Co., Ltd., Tokyo, Japan

[21] Appl. No.: 741,895

[22] Filed: Jun. 6, 1985

[30] Foreign Application Priority Data

Jun. 7, 1984 [JP] Japan .............................. 59-115556
Aug. 31, 1984 [JP] Japan .............................. 59-180775

[51] Int. Cl.$^4$ .......................... G02B 13/18; G02B 9/34
[52] U.S. Cl. .................................... 350/432; 350/465
[58] Field of Search ........................ 350/432, 469, 465

[56] References Cited

U.S. PATENT DOCUMENTS 4,394,073 7/1983 Wakamiya .......................... 350/465
4,456,345 6/1984 Fujibayashi ........................ 350/432
4,606,607 8/1986 Kurihara .............................. 350/432

*Primary Examiner*—John K. Corbin
*Assistant Examiner*—Rebecca D. Gass
*Attorney, Agent, or Firm*—Jordan B. Bierman; Bierman and Muserlian

[57] ABSTRACT

For small type wide angle lenses for use with a compact camera, so-called inverted retrofocus lenses are often used. In this type of lens, the lens can be formed into more compact by increasing a refracting power of a rear unit of a negative meniscus with a convex surface thereof greatly curved toward an image and a front unit on the side of an object. However, this arrangement gives rise to an aberration. This aberration can be compensated by introducing at least one aspherical surface into the front unit and rear unit. In addition, this aspherical lens can be easily produced if it is formed of plastics.

18 Claims, 33 Drawing Sheets

F4.0   W=35.1°

-1.0 0 1.0
SPHERICAL
ABERRATION

-1.0 0 1.0
ASTIGMATISM

-2.0 0 2.0
DISTORTION

F4.0  W = 35.1°

-1.0 0 1.0
SPHERICAL
ABERRATION

-1.0 0 1.0
ASTIGMATISM

-2.0 0 2.0
DISTORTION

WIDE ANGLE LENS

BACKGROUND OF THE INVENTION

1. Field of the Invention

This invention relates to a wide angle photogrphic lens, and more particularly to a compact lens whose telephoto ratio is 0.96 and a half angle of view is above about 35°.

2. Description of the Prior Art

For use with so-called compact cameras, an attempt has been made for development of lenses of the type in which a retrofocus type used as a wide angle lens is inverted so as to provide a photographic lens in the form of a wide angle and of a small telephoto ratio.

Of lenses of this kind, there are many lenses composed of four groups or five groups having, as a rear unit, a negative meniscus lens with a convex surface thereof greatly curved toward an image. Among these lenses, a wide angle lens of small telephoto ratio, which is simple in construction and which consists of a front unit comprising a convex, a concave and a convex and a rear unit with a surface greatly curved toward an image, has an angle of view smaller than 32°, and if this wide angle lens is used, for example, for a 35 mm lens shutter camera, focal length was more or less 35 mm. This wide angle lens has a telephoto ratio of about 1, and even if an aspherical surface is introduced therein, the telephoto ratio is above 0.95. Where a 35 mm camera is used, it has been difficult to make a length from the front end of the lens to a film surface less than 30 mm.

For example, the lens disclosed in Japanese Patent Application Laid-Open No. 73014/80 has a telephoto ratio of about 1 and an angle of view of about 31.5°, and the lens disclosed in Japanese Patent Application Laid-Open No. 94317/81 has an angle of view of about 30°. Japanese Patent Application Laid-Open No. 85410/83 disclose a compact construction but has F number of 4.5–5.6 which is dark and an angle of view of 30.7°. Japanese Patent Application Laid-Open No. 59217/81 discloses one in which an aspherical surface is introduced into a post-group lens, which has an angle of view of 31.5° and a telephoto ratio is above 0.95.

Japanese Patent Application Laid-Open Nos. 133711/81, 95207/81, 1117/83, 62608/83, 44016/84, etc. have been known which provide a five-group construction. Any of these patent applications have an angle of view smaller than 64°. The lens disclosed in Japanese Patent Application Laid-Open No. 219509/83 has an angle of view of 39° but a telephoto ratio is great, i.e., 1.1, which is not sufficient to form the lens into compactness.

Japanese Patent Application Laid-Open Nos. 75612/81, 94317/81 and 57106/83 have been known which provide a four-group construction and in which a negative meniscus lens gratly curved in the post-group is made of resin. However, an easily processed resin lens has a disadvantage that a change in refractive index due to a change in temperature is great therby posing a problem that backfocus is varied. This disadvantage becomes remarkable if a power of a negative lens is increased to reduce the overall length of lens. As an example, there is disclosed Japanese Patent Application Laid-Open No. 44016/84 in which a resin lens having no power if formed into an aspherical surface in order to eliminate the aforesaid disadvantage. However, this proposal has a limitation in the design of lens.

SUMMARY OF THE INVENTION

It is an object of this invention to provide, in a so-called inverted retrofocus type lens, a wide angle lens in which aspherical surfaces are introduced into a front unit and a rear unit to thereby obtain a half angle of view of 35° and a telephoto ratio of 0.96 or less.

It is another object of the invention to provide a lens in which a lens into which an aspherical surface is introduced comprises an easily processed resin lens while minimizing the influence by change in temperature.

In accordance with the present invention, there is provided a wide angle lens comprising a lens system which is composed of, from an object side, a front unit comprising a positive lens $L_1$, a negative lens $L_2$ and a positive lens $L_3$ and a rear unit comprising a negative meniscus $L_4$ with a convex surface thereof greatly curved toward an image, wherein at least one of refractive surfaces of the lens $L_3$ and at least one surface of the fourth lens are formed into an aspherical surface, and wherein the following conditions are satisfied:

$$0.45 < f/|f_4| < 2.5 \quad f_4 < 0 \tag{1}$$

$$1.7 < N_2 \tag{2}$$

where
$f_4$: focal length of the fourth lens $L_4$
$N_2$: refractive index of a glass material of the second lens $L_2$.

It will be noted that the aforesaid third positive lens $L_3$ can be of a single lens or a cemented lens composed of a positive lens and a negative lens, and or can be composed of two positive lenses $L_{31}$ and $L_{32}$.

If an aspherical shape is expressed by $$X = \frac{C\phi^2}{1 + \sqrt{1 - (1+k)C^2\phi^2}} + \sum_i A_i \phi^{P_i}$$

the amount of displacement due to the aspherical surface is given by the following with respect to the j surface:

$$\Delta X_j(\phi) = \frac{C\phi^2}{1 + \sqrt{1 - (1+k)C^2\phi^2}} + \sum_i A_i \phi^{P_i} - \frac{C^*\phi^2}{1 + \sqrt{1 - C^{*2}\phi^2}}$$

$C^* = C + 2A_2$ (paraxial curvature)
$\phi$: height from an optical axis

Preferably, the following conditions are satisfied:
Where an aspherical surface is introduced into each lens surface, in the surface of the first lens on the object side, $$-0.5 \times 10^{-2} < \Delta X(0.13f)/f < -0.1 \times 10^{-4} \tag{3}$$

where it is introduced into an image side of the first lens, $$0.1 \times 10^{-4} < \Delta X(0.13f)/f < 0.1 \times 10^{-1} \tag{4},$$

in case of the object side of the second lens, $$-0.5 \times 10^{-2} < \Delta X(0.1f)/f < -0.1 \times 10^{-4} \tag{5},$$

in case of the image side of the second lens, $$0.1\times 10^{-4}<\Delta X(0.1f)/f<0.5\times 10^{-2} \quad (6),$$

in case of the object side of the third lens, $$-0.5\times 10^{-2}<\Delta X(0.1f)/f<-0.1\times 10^{-4} \quad (7),$$

in case of the image side of the third lens, $$0.1\times 10^{-4}<\Delta X(0.1f)/f<0.5\times 10^{-2} \quad (8),$$

in case of the concave surface on the object side of the fourth lens, $$0.5\times 10^{-3}<\Delta X(0.13f)/f<0.3 \quad (9),$$

in case of the convex surface on the image side of the fourth lens, $$-0.5\times 10^{-1}<\Delta X(0.14f)/f<-0.1\times 10^{-4} \quad (10),$$

and where both surfaces of the fourth lens are formed into an aspherical surface, the object side is $$0.1\times 10^{-1}<\Delta X(0.13f)/f<0.3 \quad (11)$$

and the image side is $$0.3\times 10^{-3}<\Delta X(0.14f)/f<0.3\times 10^{-1} \quad (12)$$

It will be of course noted that the aspherical surface is not limited to a respective one surface of the front unit and rear unit but it can be introduced into surfaces more than three in total. In this case, a problem is present in respect of a total of an amount of displacement of the front unit and rear unit from the respective spherical surfaces.

Where the third positive lens $L_3$ is a single lens or a cemented lens, the following conditions are satisfied: for the first to the third lenses, $$-0.5\times 10^{-2}f<\Delta X_1(0.13f)+\Delta X_3(0.1f)+\Delta X_5(0.1f)-\Delta X_2(0.13f)-\Delta X_4(0.1f)-\Delta X_6(0.1f)<-0.1\times 10^{-4}f \quad (13)$$

and for the fourth group, $$0.1\times 10^{-3}f<\Delta X_7(0.13f)-\Delta X_8(0.14f)<0.3f \quad (14)$$

More favorably, there is satisfied with the following condition:

$$1.15<f/f_{1,2,3}<2.0 \quad (15)$$

$f_{1,2,3}$: combined focal length of the front unit.

Where the third lens $L_3$ is composed of two positive lenses $L_{31}$ and $L_{32}$, there is satisfied with the following conditions, with resepct to these lenses $L_{31}$ and $L_{32}$, $$-1.0\times 10^{-2} < \frac{\Delta X_5(0.1f)+\Delta X_7(0.1f)-\Delta X_6(0.1f)-\Delta X_8(0.1f)}{f} < -0.5\times 10^{-4}, \quad (16)$$

and with respect to the rear unit $$0.2\times 10^{-3} < \frac{\Delta X_9(0.13f)-\Delta X_{10}(0.14f)}{f} < 0.3 \quad (17)$$

Where either of the positive lenses $L_{31}$ and $L_{32}$ and the negative meniscus lens $L_4$ are made to comprise resin lenses, the following condition is satisfied:

$$0.5<f_{Lp}/|f_4|<5.0 \quad (18)$$

where $f_{Lp}$ is the focal length of $L_{31}$ or $L_{32}$ formed of resin.

In the wide angle lens wherein the front unit comprises a construction composed of positive, negative, positive and the rear unit comprises a negative meniscus lens greatly curved toward the image, the positive refracting power of the front unit and the negative refracting power of the rear unit need be increased if the telephoto ratio is desired to be further reduced. However, if the refracting power of the front unit is increased, spherical aberration is short in compensation to generate an outwardly directed comatic flare, and an image surface curve is short in compensation and a distortion aberration becomes a bobbin shape. Further, if the refracting power of the rear unit is increased, an outwardly directed comatic flare is generated to increase the distortion aberration of the bobbin type.

The condition (1) is concerned with the negative refracting power of the fourth lens $L_4$ which belongs to the rear unit. When the value exceed the lower limit, movement of a main point on the image side forwardly of the lens reduces and the telephoto ratio increases. Conversely, when the value exceeds the upper limit, the image surface curve becomes excessively compensated as described above, and occurrence of the outwardly directed coma and bobbin type distortion aberration is remarkable.

The condition (2) is provided to keep Petzval's sum adequate. In general, it has a tendency in the compact lens that the Petzval's sum becomes excessively small. Because of this, the refractive index of the second lens $L_2$ which is a negative lens is taken within the range of this condition whereby the image surface curve may be restrained within a suitable range.

The refracting powers of the front unit and rear unit are increased, as described above, and the aspherical shapes are introduced to compensate various aberrations generated accordingly because the refracting power of the lens composed of positive, negative and positive in the front unit is too great to compensate the concave lens of the rear unit. Therefore, a surface having a convex power preferably comprises a modified ashperical surface in the shape whose curvature becomes gentler than a parent spherical surface due to the paraxial curvature as it moves away from an optical axis whereas a surface having a concave power preferably comprises a modified aspherical surface in the shape whose curvature becomes sharper than a parent spherical surface due to the paraxial curvature as it moves away from an optical axis.

The conditions (3) to (8) are concerned with such modified spherical surfaces as described above.

The condition (3) is provided to compensate a spherical aberration short in compensation, to compensate distortion aberrations of the outwardly directed coma and the bobbin type, and to compensate the image surface curve toward the over side.

The condition (4) is provided to show that outside the optical axis, a refracting surface is deformed from a parent spherical surface toward an image to compensate the spherical aberration and the short in compensation of the image surface curve.

The condition (5) is provided to show that outside the optical axis, a refracting surface is deformed toward an object, similarly to the condition (3), to thereby reduce the outwardly directed coma generated in the front unit and to minimize also the spherical aberration and bobbin type distortion aberration.

The condition (6) is provided for deformation similar to that of the condition (4), which is effective mainly for compensation of spherical aberration and image surface curve.

The condition (7) is similar in deforming direction and effect of an aspherical surface to those of the condition (5).

The condition (8) is provided to show that outside that optical axis, a refracting surface is deformed toward an image relative to a paraxial parent spherical surface to reduce the outwardly directed coma, and also reduce a spherical aberration and a bobbin type distortion aberration.

Of threshold values of the above-described conditions, the lower limit for positives and the upper limit for negatives are the limits at which effects of formation of aspherical surface are produced, and the upper limit for positives and the lower limit for negatives are the limits at which aspherical deformation is not excessively great, resulting in surplus compensation.

As clearly shown in a light path of FIG. 1, a portion A of edge light fluxes is incident upon external portions of convex, concave and convex lenses with formation of lens into wider angle, and occurrence of aberrations at said portions is remarkable. This can be compensated by the introduction of aspherical surfaces in the aforementioned conditions (3) to (8). On the other hand, a portion B of light fluxes passes through a high position outside the fourth lens, and occurrence of aberrations at sid portion is remarkable. The conditions of formation into aspherical surface to cope with the just-mentioned state are as in the conditions (9) to (12).

The condition (9) is provided to show that the curvature of the refracting surface is made gentle relative to the parent spherical surface outside the axis whereby the aforesaid outwardly directed coma and bobbin type distortion aberration may be reduced.

The condition (10) is provided to show that movement of an aspherical surface from the parent spherical surface outside the axis is made so as to make a curvature sharp whereby an inwardly directed coma is greatly produced as compared with the parent spherical surface, and as a consequence, an outwardly directed coma in the entire lens system is reduced. Also in the distortion aberration, a great barrel type aberration is produced at said surface, as a consequence of which a bobbin type distortion aberration in the entire system is reduced.

In these conditions (9) and (10), the lower limit of the condition (9) and the upper limit of the condition (10) are the limits at which compensation effect due to the ashperical surface is obtained, and the upper limit of the condition (9) and the lower limit of the condition (10) are the limits at which surplus compensation is not effected.

While the aforesaid limits are provided in case where one surface in the front unit and one surface in the rear unit are formed into ashperical surfaces, it should be noted that the aforesaid limits are not limited thereto but more than three surfaces in both front unit and rear unit can be formed into aspherical surfaces. In such a case, it will suffice that the above-described effects are brought forth by the total of effects obtained by the formation of ashperical surfaces, and therefore, directions of displacement of ashperical surfaces of individual surfaces are sometimes different from those of the conditions (3) to (10).

The condition (18) is provided to control the total of displacement of aspherical surfaces in the front unit in the case as described above, and the condition (14) is provided to control the total of displacement in the rear unit. The upper limit of the condition (13) and the lower limit of the condition (14) are the limits at which compensation effect can be expected, and conversely, the lower limit and the upper limit are the limits at which displacement becomes excessively large to produce no excessive aspherical effect.

Where both surfaces of the fourth group lens are formed into aspherical surfaces under the condition (14), the conditions (11) and (12) are preferably satisfied. The condition (12) is concerned with, along with the condition (11), the displacement in a direction at which both the surfaces of the fourth group lens are gentler in curvature outside the axis than that of the parent spherical surface, which is a displacement in a direction opposite to that of the condition (10). This arrangement is provided to make a comatic aberratin flat at an angle of view above 28°. A large displacement of an aspherical surface of a surface on the object side is employed under the condition (11), and this enables a comatic aberration flat but in this case, an image surface curve is short in compensation and a bobbin type distortion aberration increases. However, the image side surface can be formed into an aspherical surface as in the condition (12 to thereby compensate the image surface curve and bobbin type distortion aberration.

The condition (15) is provided to increase the refracting power of the front unit to reduce the telephoto ratio. If the value exceeds the lower limit, the aforesaid effect is not obtained, and if the value exceed the upper limit, short in compensation of spherical aberration, bobbin type distortion aberration and great outwardly directed coma occur, leading to a difficulty in compensation even by the formation of aspherical surfaces.

The condition (16) is provided so that where the third positive lens $L_3$ is composed of two positive lenses $L_{31}$ and $L_{32}$, the positive lenses $L_{31}$ and $L_{32}$ are formed into aspherical surfaces to compensate the aforementioned various aberrations. In surfaces of these lenses on the object side, an aspherical shape is employed which is displaced toward the object than a surface of a paraxial radius of curvature as it moves from a center of an optical axis toward an edge whereby a tendency occurs which compensates various aberrations produced in the front unit. In a surface on the image side, the provision of an aspherical shape displaced toward an image than a surface of a paraxial radius of curvature compensates various aberrations.

The condition (17) is concerned with an aspherical shape of a negative meniscus lens $L_5$ in the rear unit. In the object side, an aspherical shape displaced toward an image from a surface of a paraxial radius of curvature as it moves from a center of an optical axis to an edge reduces an outwardly directed coma to minimize a bobbin type distortion aberration. Similarly, in an image side, displacement toward an object than a surface of a paraxial radius of curvature compensates the aforesaid aberration.

The aforementioned effects are not required independently with respect to individual surfaces as will be apparent from the conditions (16) and (17). Where a single aspherical surface is present, the aforementioned description is applied, but where a plurality of surfaces are formed into aspherical surfaces, a surface which principally contributes to compensation of aberrations is displaced as described above but a surface which auxiliarily contributes to compensation of aberrations is often displaced reversely thereto. However, the arrangement within the range of the conditions (16) and (17) as a whole will suffice.

The upper limit of the condition (16) and the lower limit of the condition (17) are the limits at which aberration compensation by deformation of an aspherical surface is effectively effected, and the lower limit of the condition (16) and the upper limit of the condition (17) are the conditions under which surplus compensation is avoided.

In a lens system in which the third lens $L_3$ is composed of two positive lenses $L_{31}$ and $L_{32}$, either one of the positive lenses $L_{31}$, $L_{32}$ in the ante-group and the negative lens $L_4$ in the rear unit can be of the resin lenses. As previously mentioned, in the resin lenses, backfocus changes by the change in refractive index resulting from the change in temperature, which poses a problem when they are used for a camera.

On the other hand, if both positive and negative lenses are formed of resins, the influence by the change in temperature can be mutually offset. This invention provides an arrangement wherein the positive lens $L_{31}$ or $L_{32}$ and the negative lens $L_4$ are formed of resins but the positive lens $L_{31}$ or $L_{32}$ is smaller in power than that of the negative lens $L_4$ but is positioned frontwardly of the negative lens $L_4$, whereby variation of backfocus resulting from the change in temperature by the negative lens $L_4$ can be restrained.

The condition (18) is provided to show the range in which such variation of backfocus can be offset.

DETAILED DESCRIPTION OF EMBODIMENTS

Figure 1:
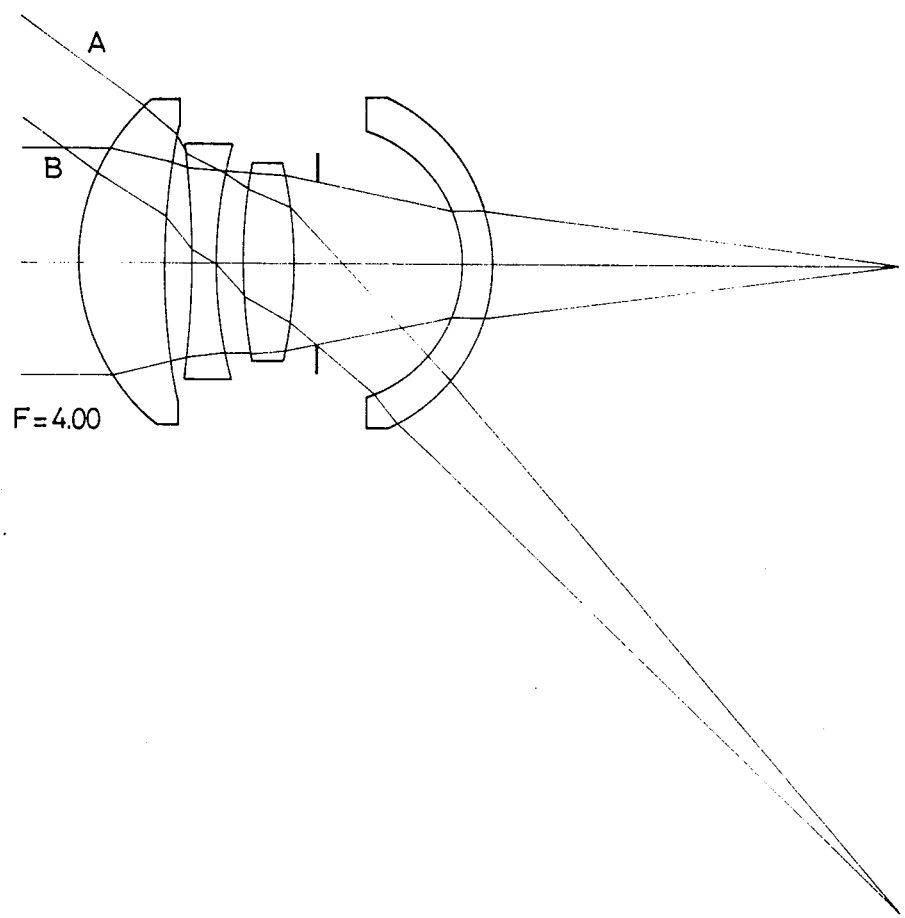
FIG. 1 is a view showing a light path of lenses according to the present invention.
Figure 2A:
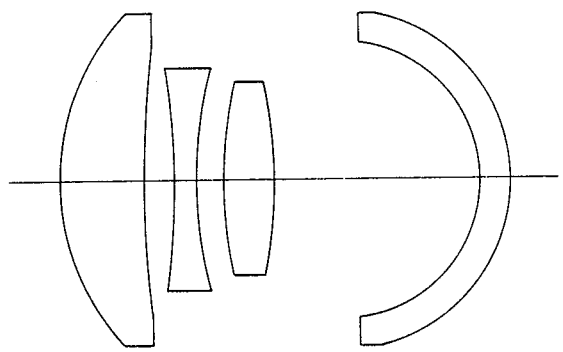
FIGS. 2 to 22 illustrate embodiments 1 to 21 in which a third positive lens $L_3$ comprises a single lens or a cemented lens.
Figure 2B:
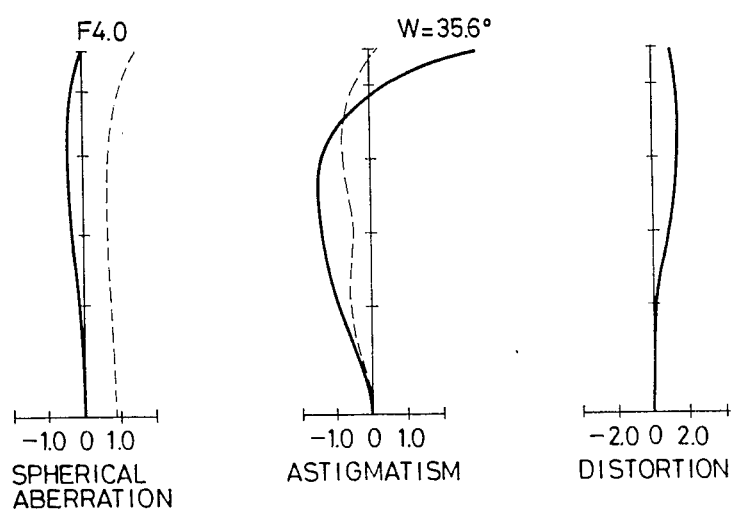
Figure 3A:
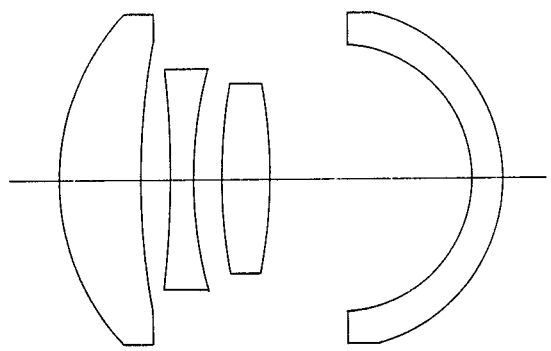
Figure 3B:
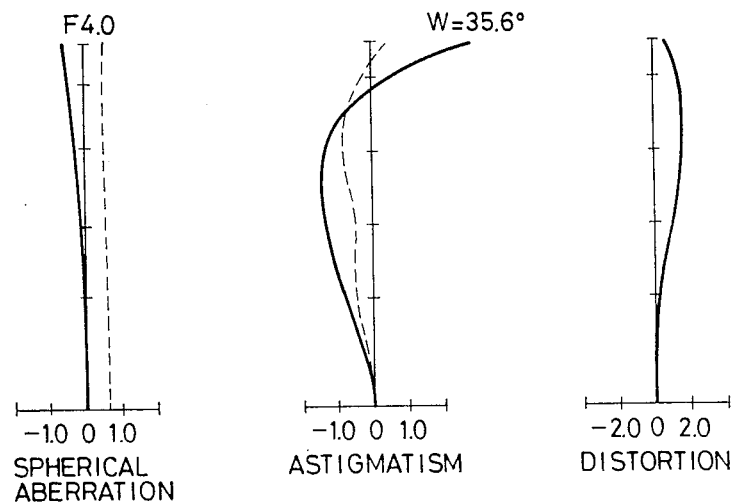
Figure 4A:
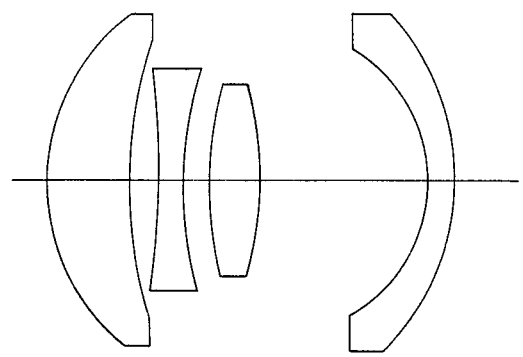
Figure 4B:
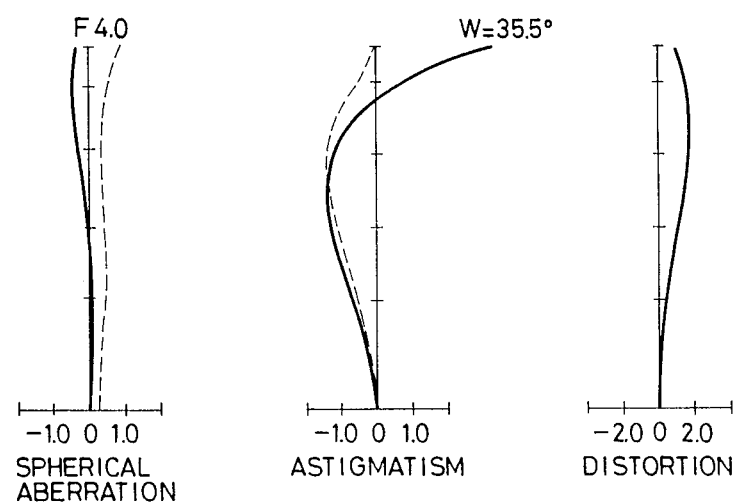
Figure 5A:
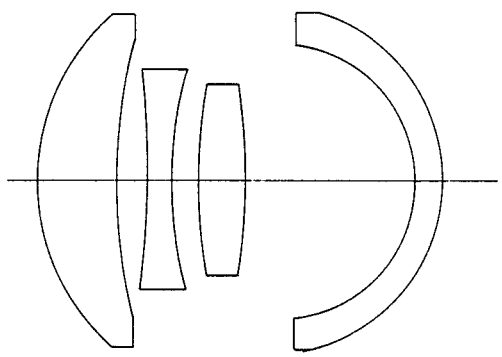
Figure 5B:
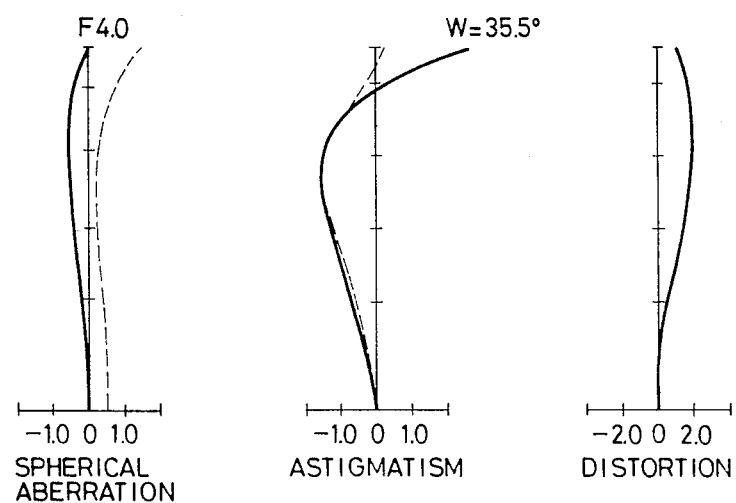
Figure 6A:
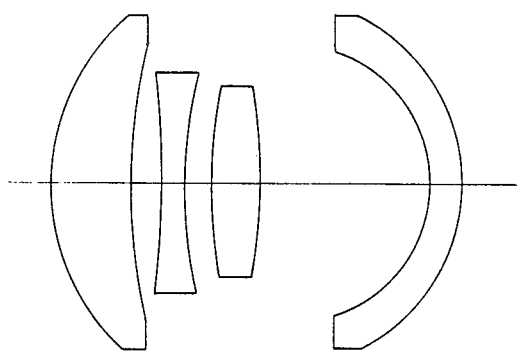
Figure 6B:
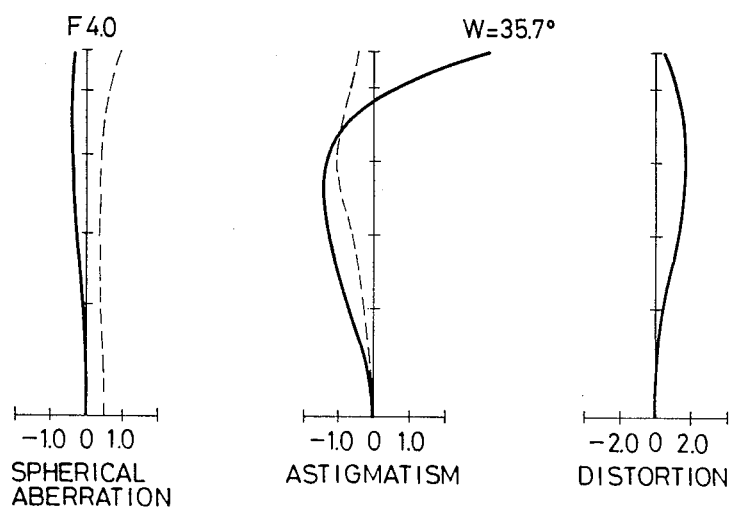
Figure 7A:
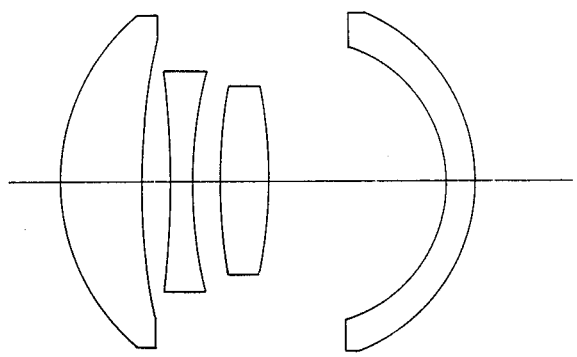
Figure 7B:
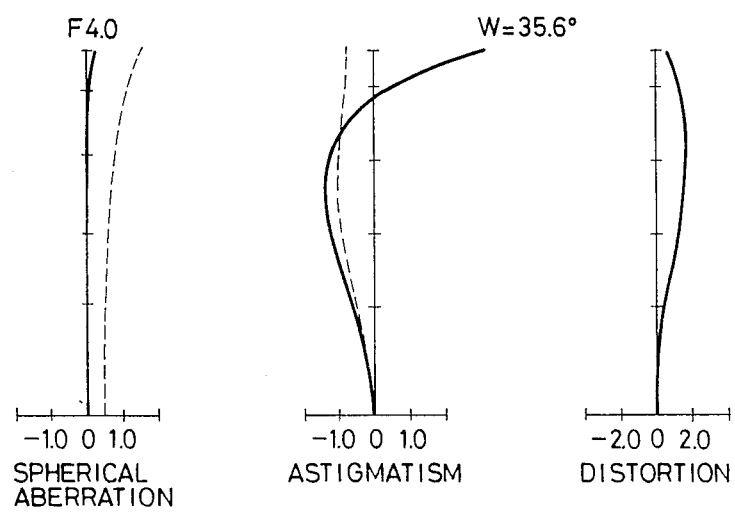
Figure 8A:
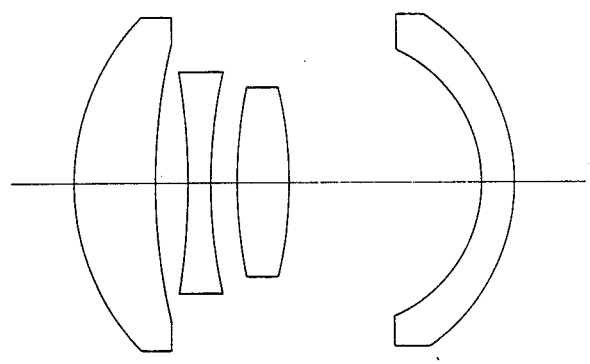
Figure 8B:
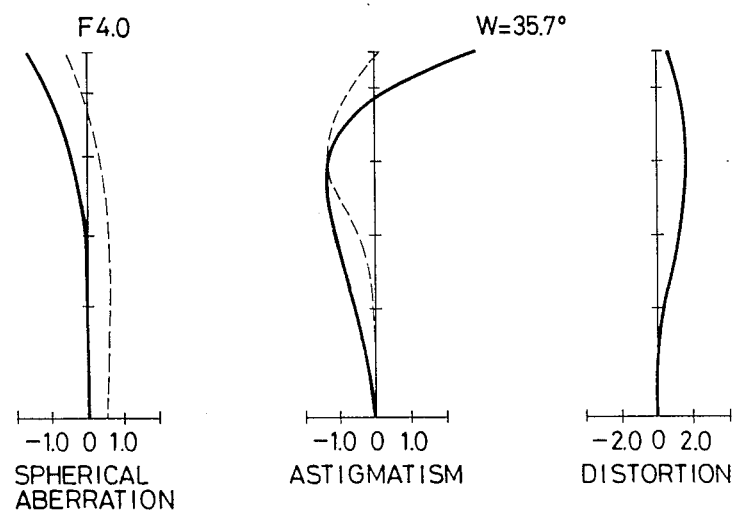
Figure 9A:
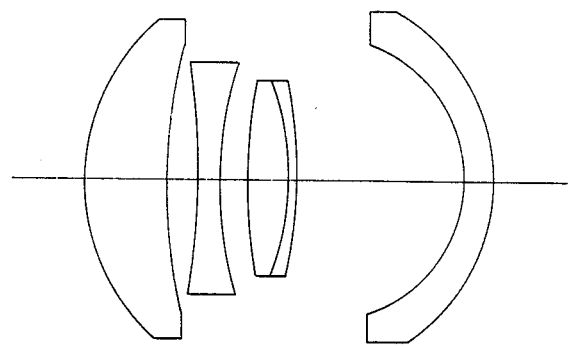
Figure 9B:
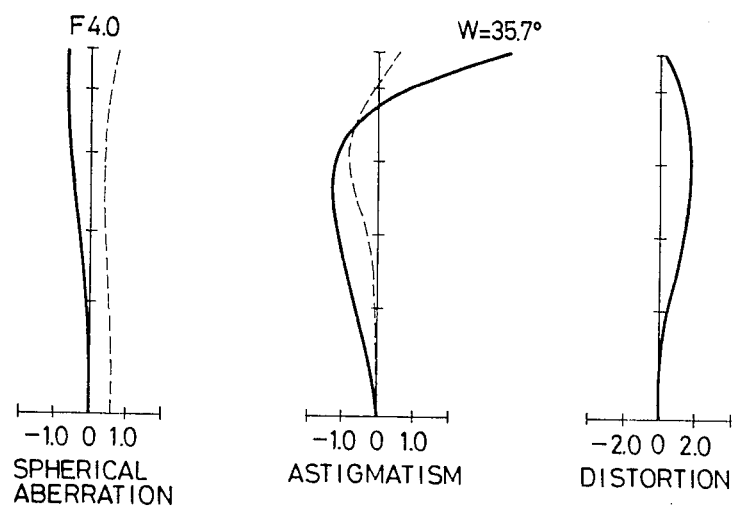
Figure 10A:
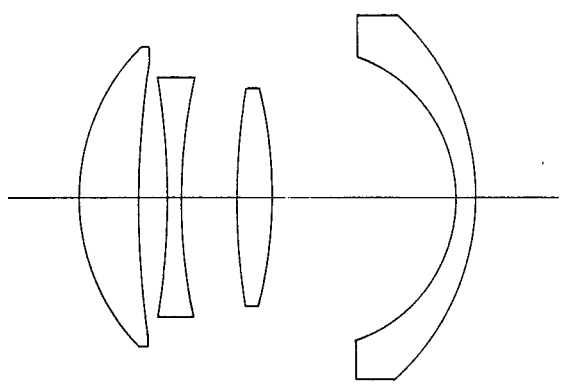
Figure 10B:
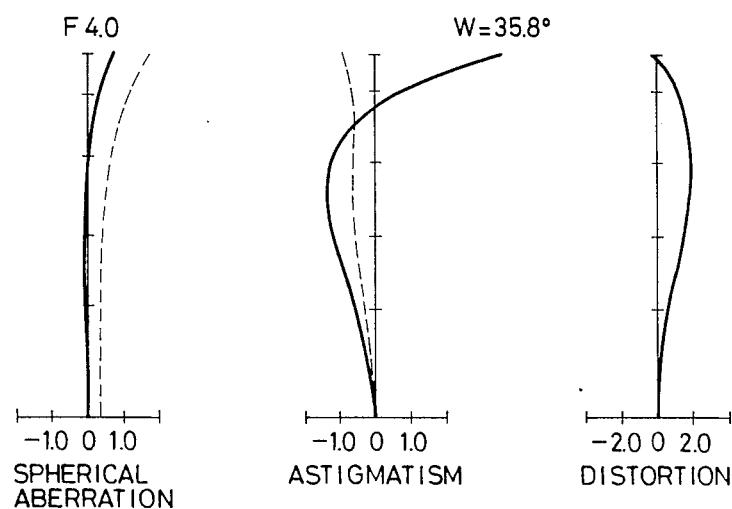
Figure 11A:
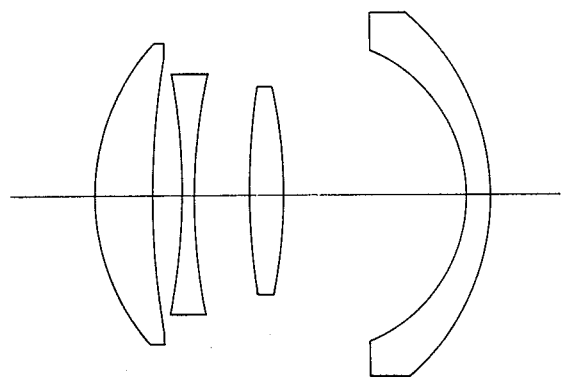
Figure 11B:
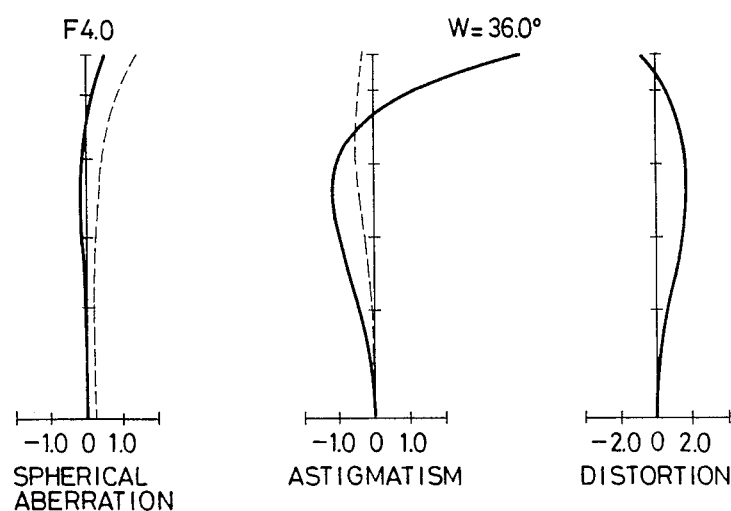
Figure 12A:
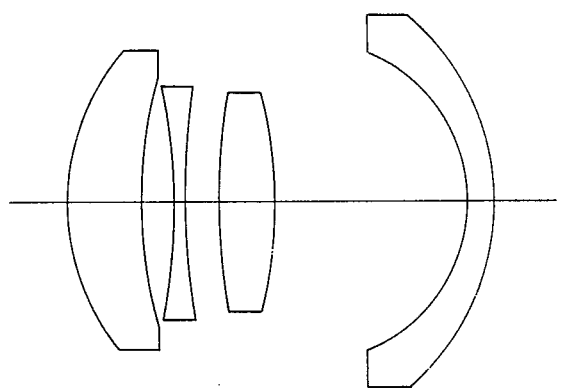
Figure 12B:
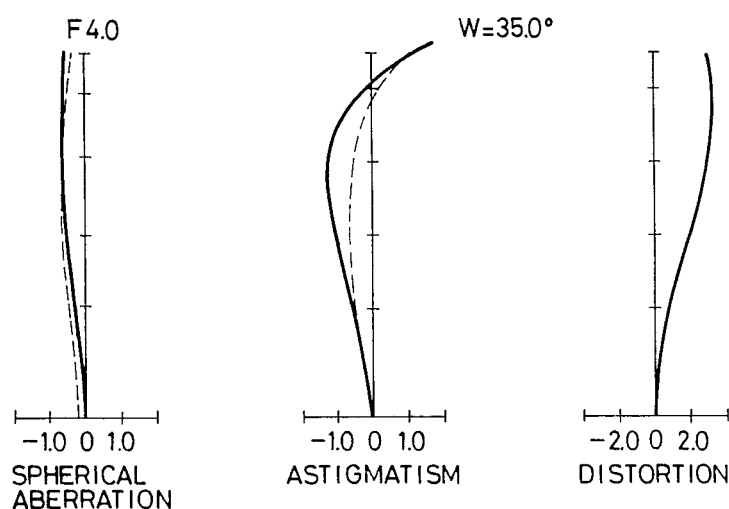
Figure 13A:
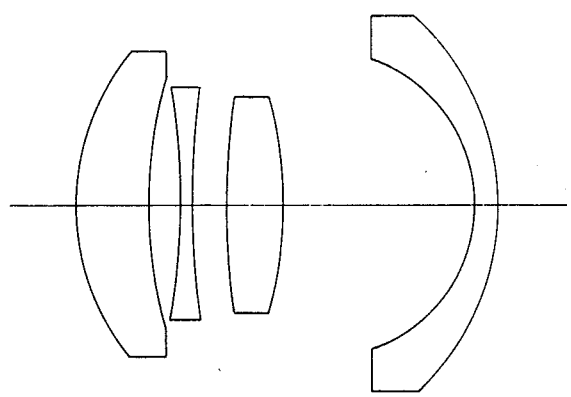
Figure 13B:
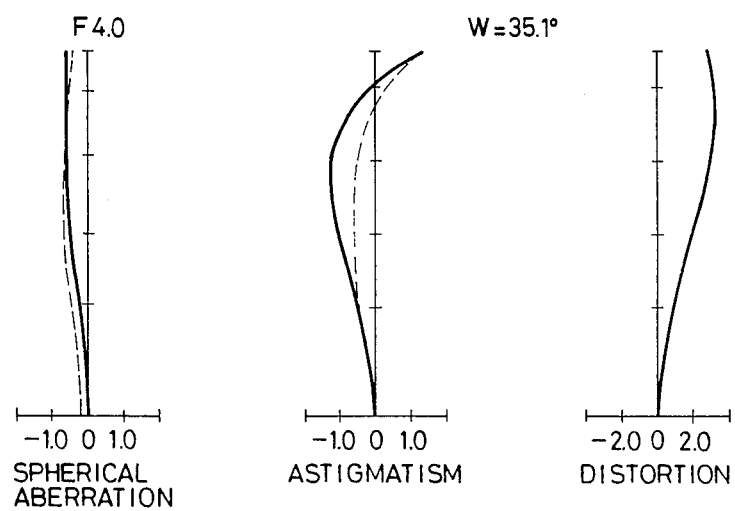
Figure 14A:
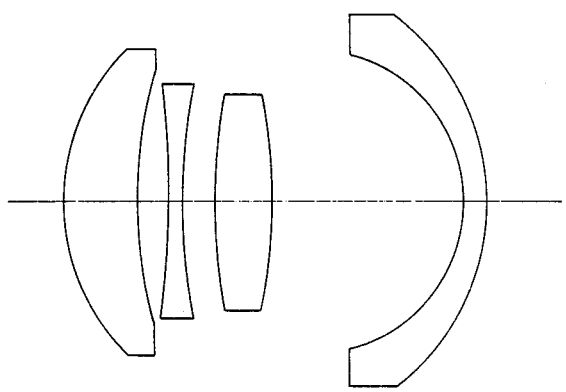
Figure 14B:
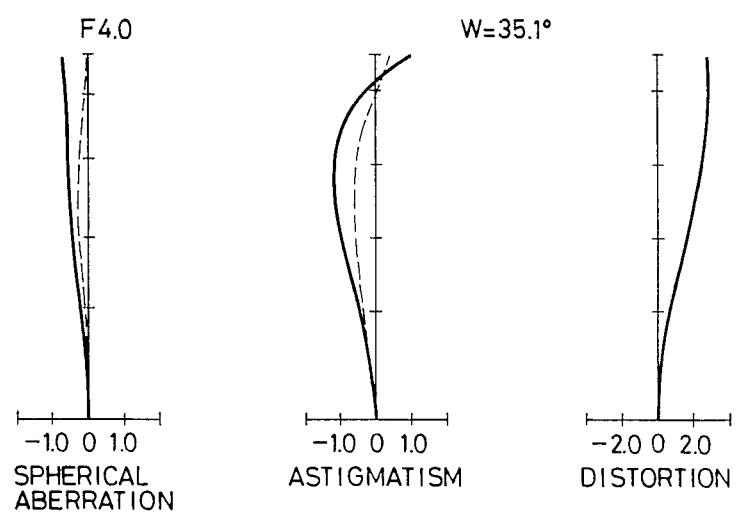
Figure 15A:
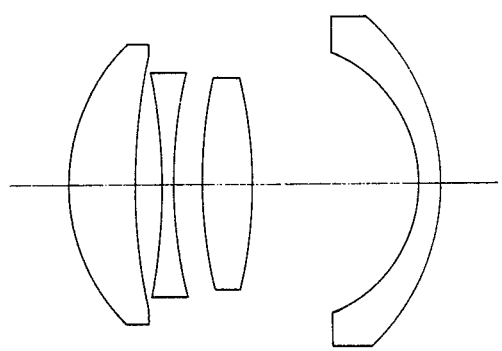
Figure 15B:
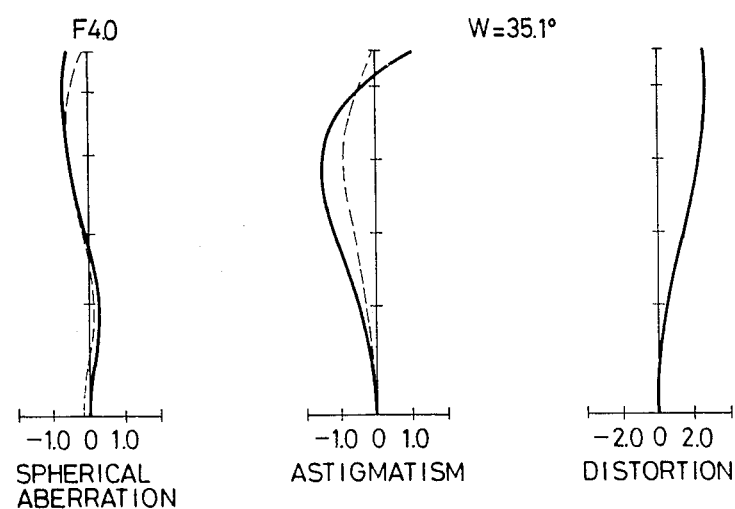
Figure 16A:
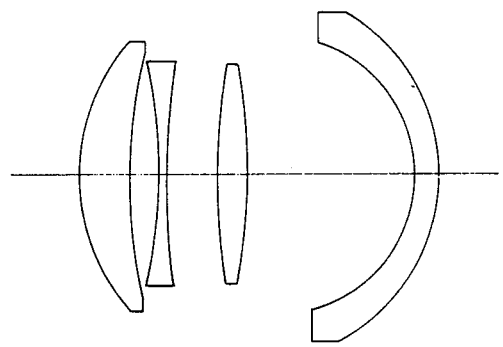
Figure 16B:
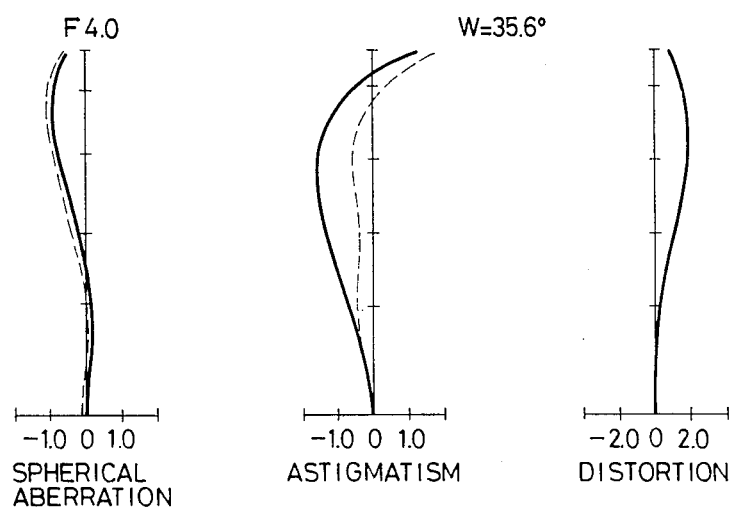
Figure 17A:
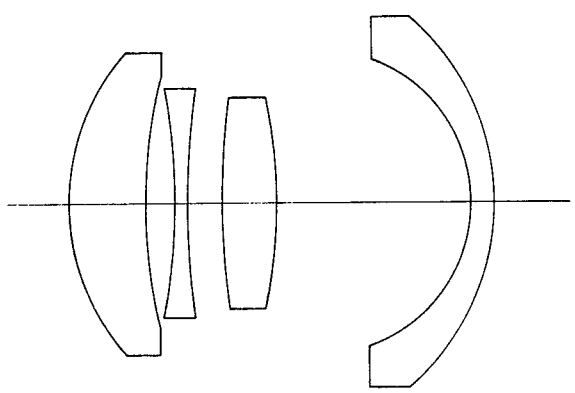
Figure 17B:
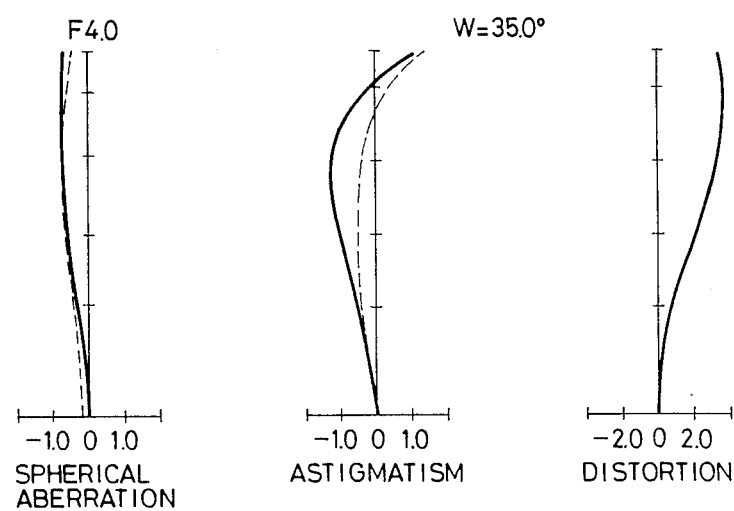
Figure 18A:
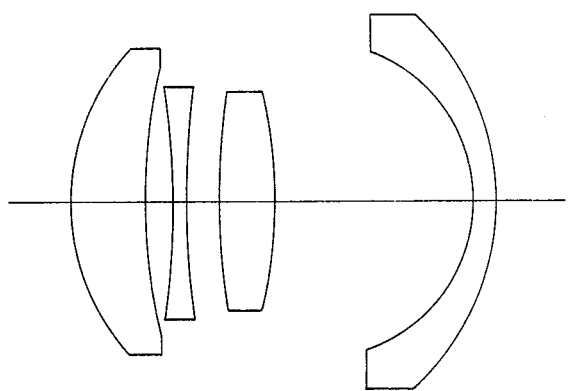
Figure 18B:
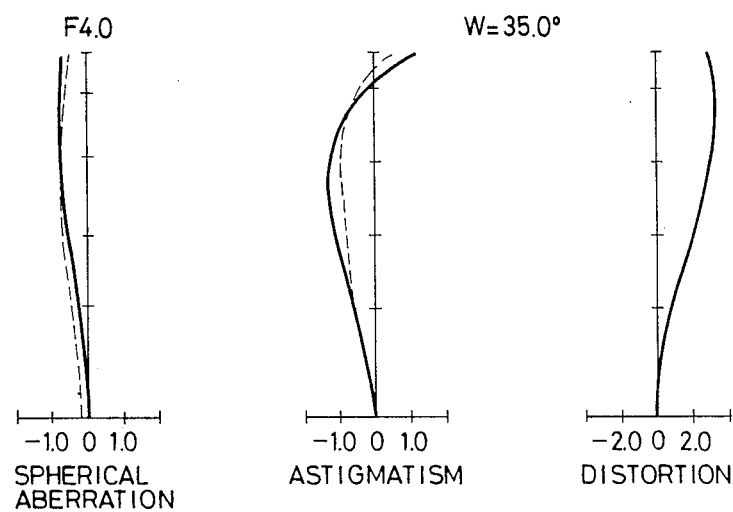
Figure 19A:
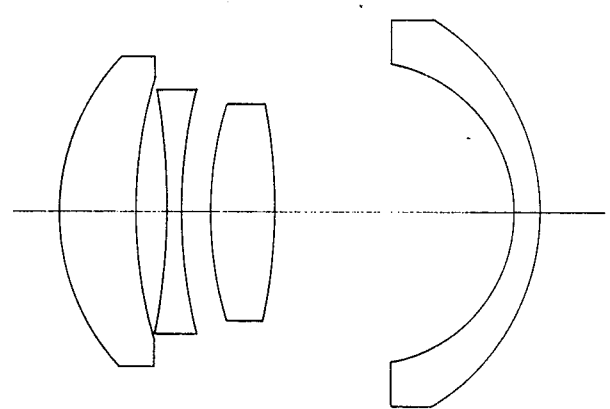
Figure 19B:
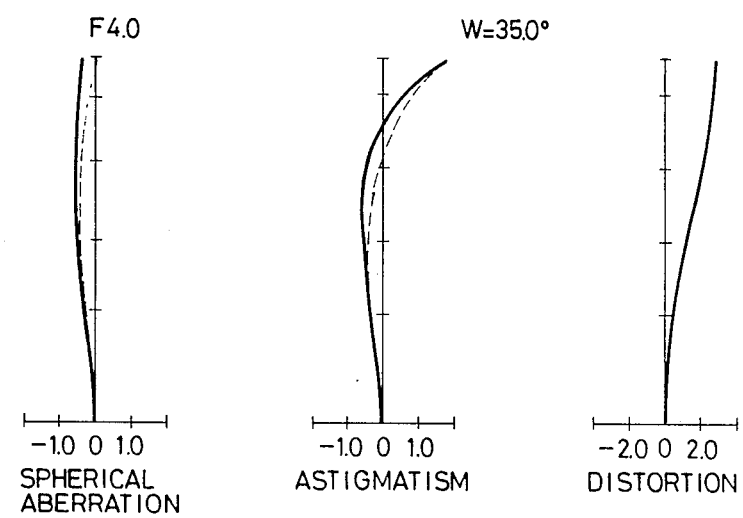
Figure 20A:
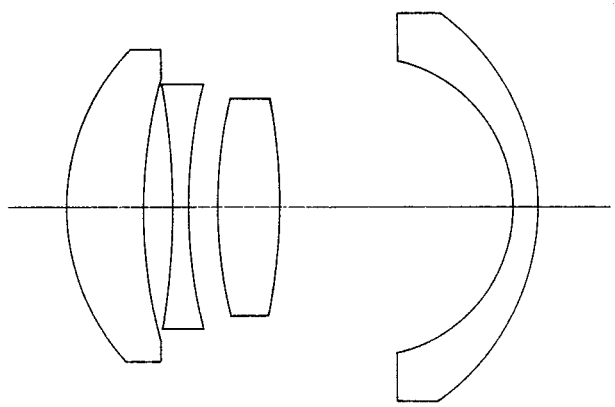
Figure 20B:
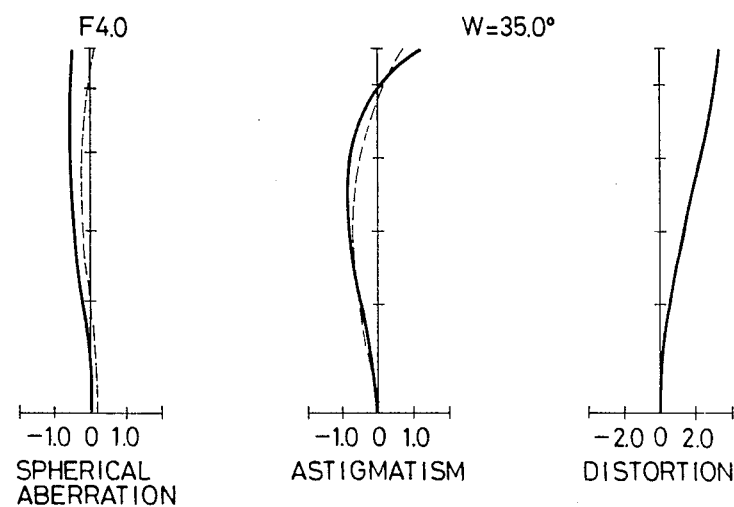
Figure 21A:
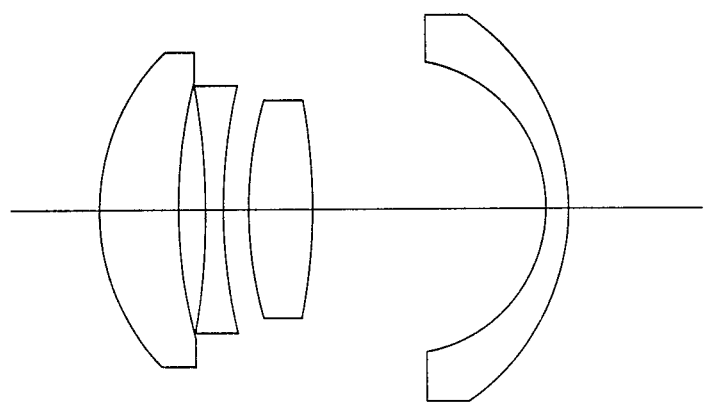
Figure 21B:
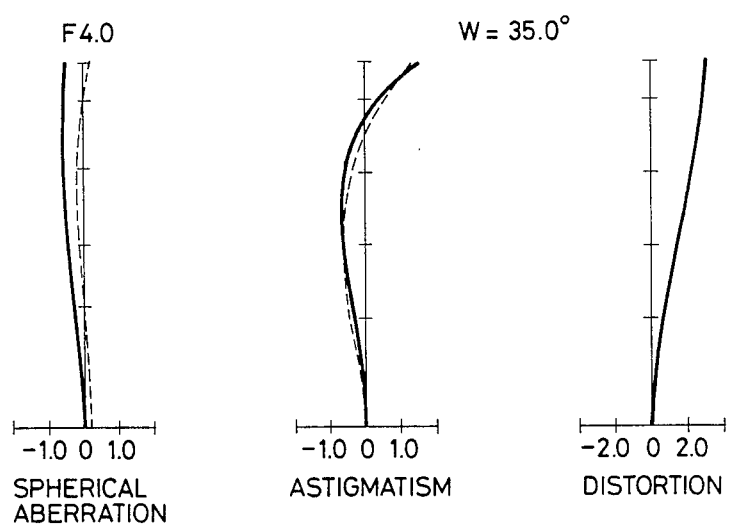
Figure 22A:
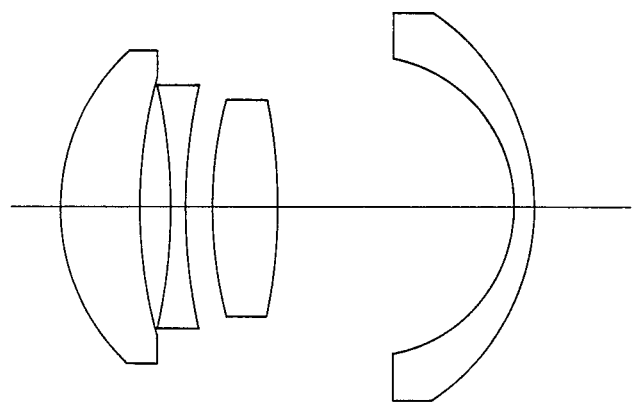
Figure 22B:
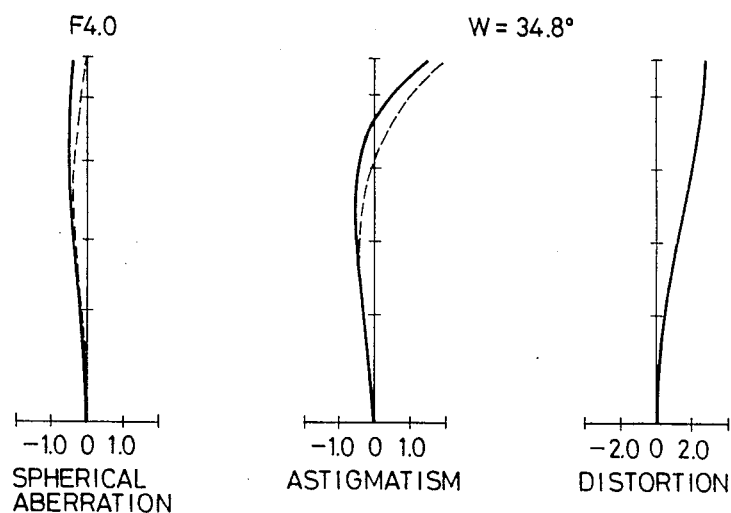
Figure 23A:
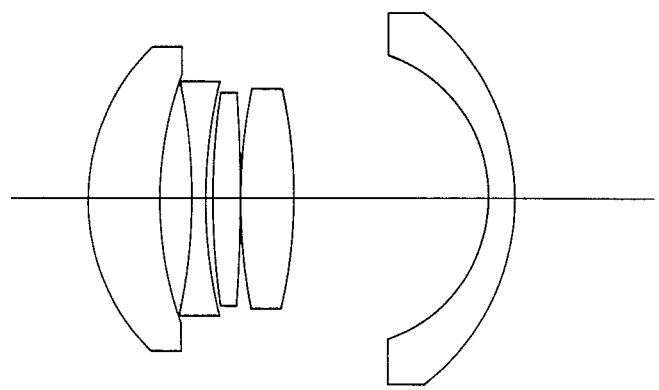
FIGS. 23 to 33 illustrate embodiments 22 to 32 in whcih a third positive lens $L_3$ comprises two positive lenses $L_{31}$ and $L_{32}$. In these drawings, (A) denotes a sectional view of a lens and (B) denotes various aberrations thereof.
Figure 23B:
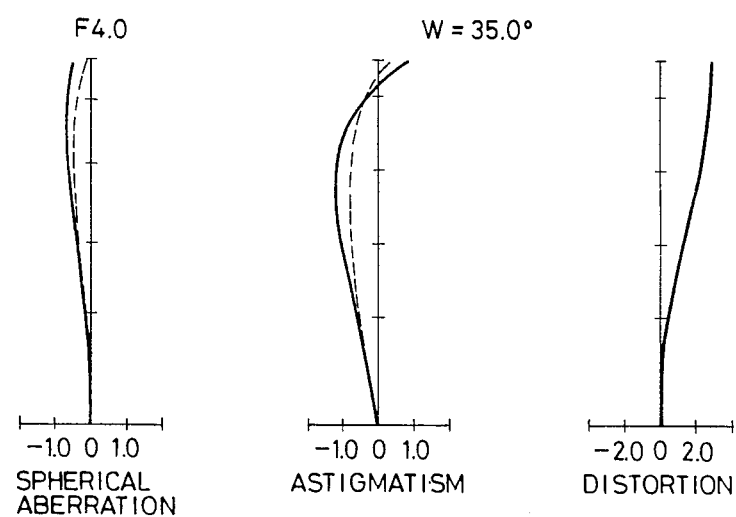
Figure 24A:
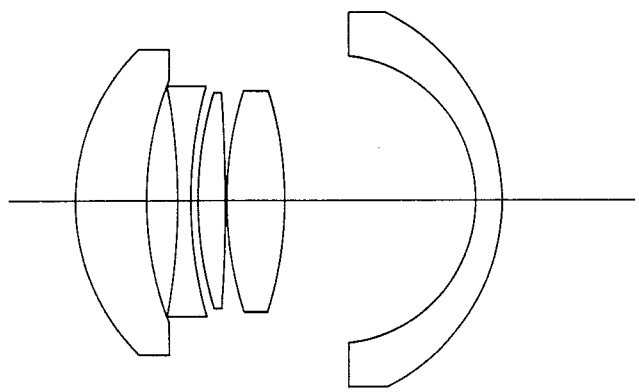
Figure 24B:
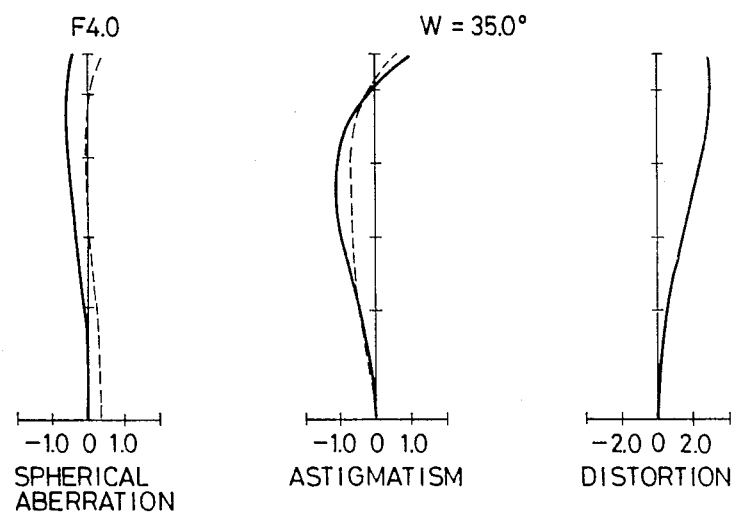
Figure 25A:
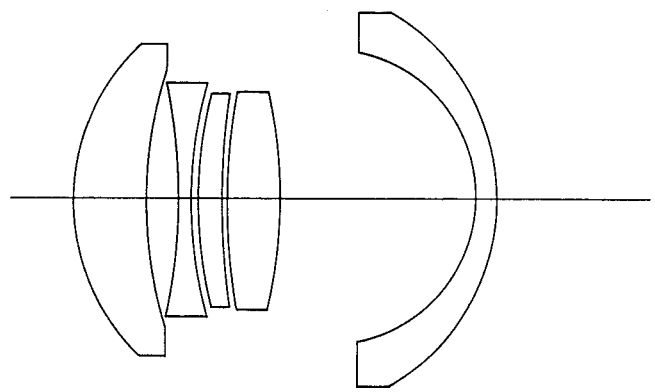
Figure 25B:
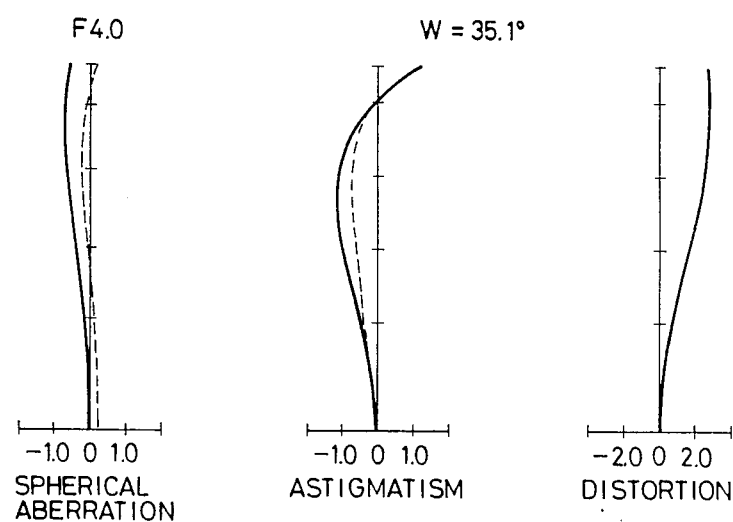
Figure 26A:
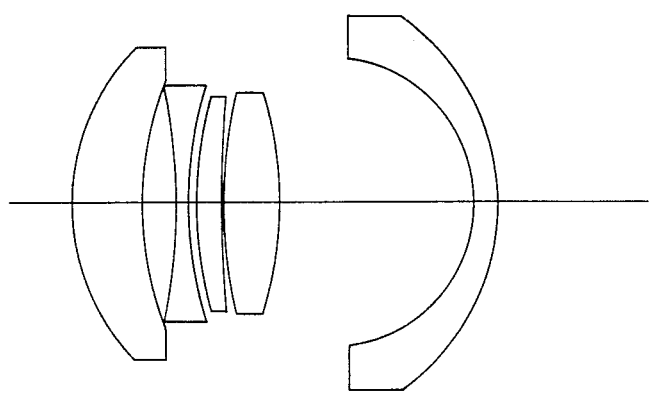
Figure 26B:
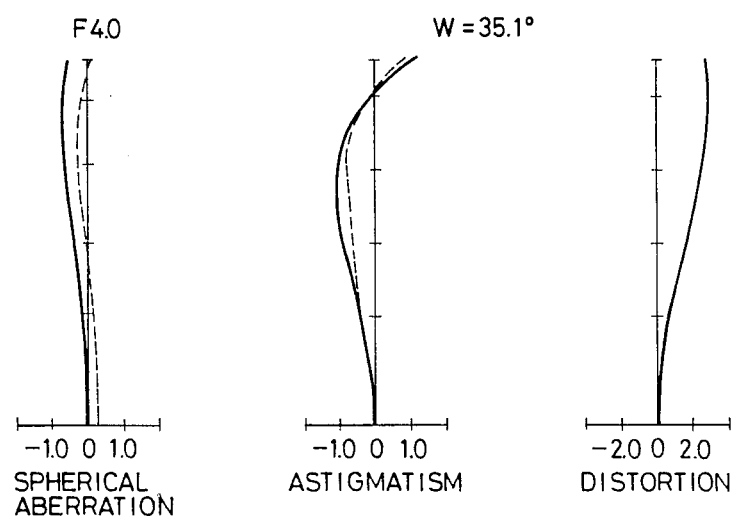
Figure 27A:
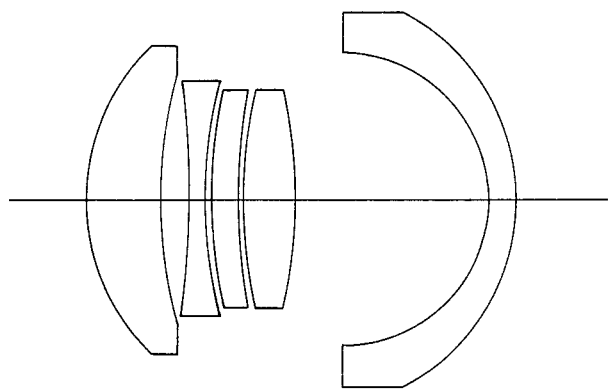
Figure 27B:
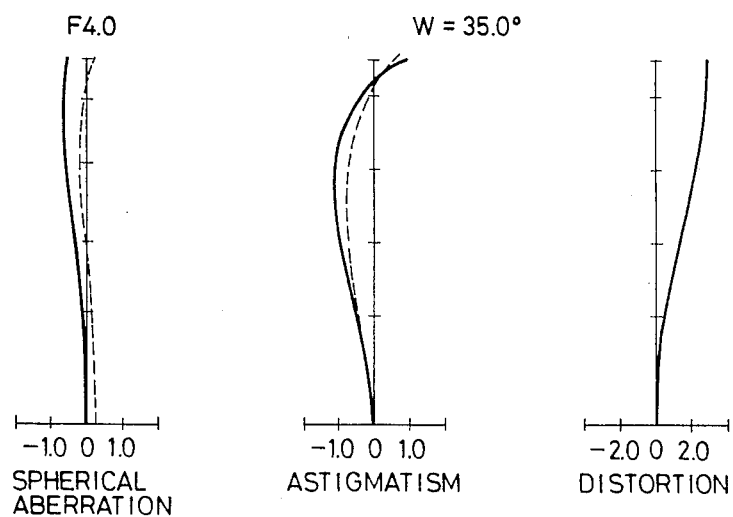
Figure 28A:
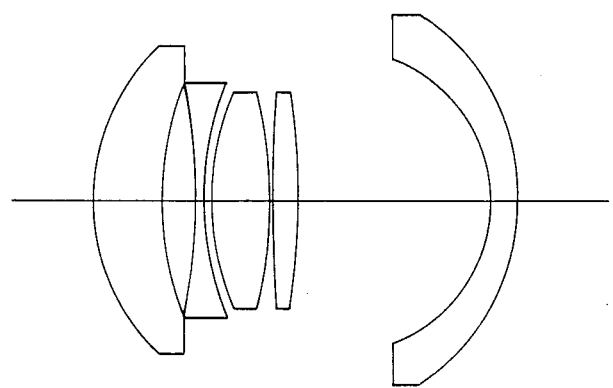
Figure 28B:
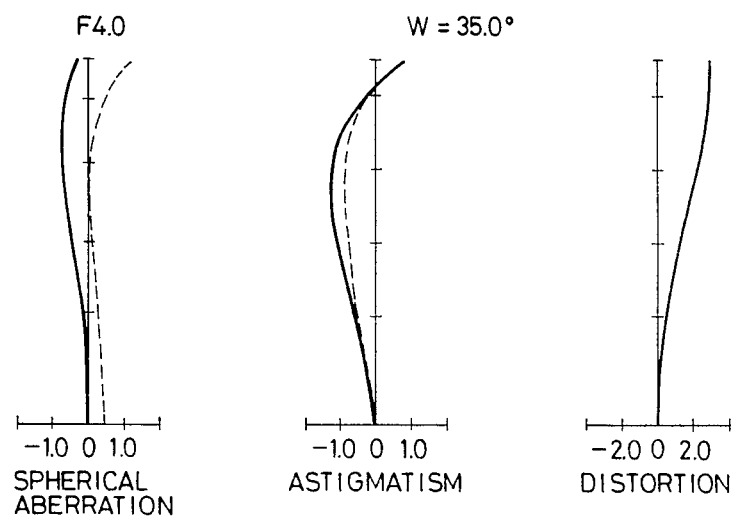
Figure 29A:
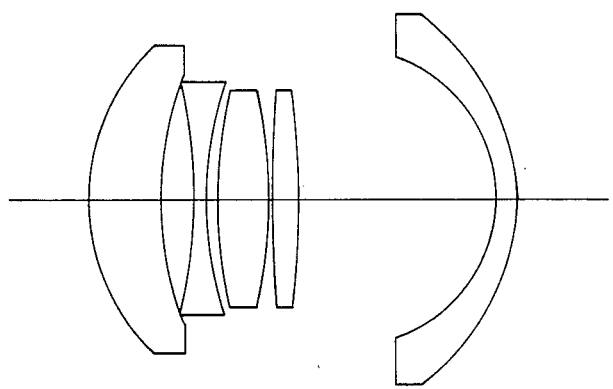
Figure 29B:
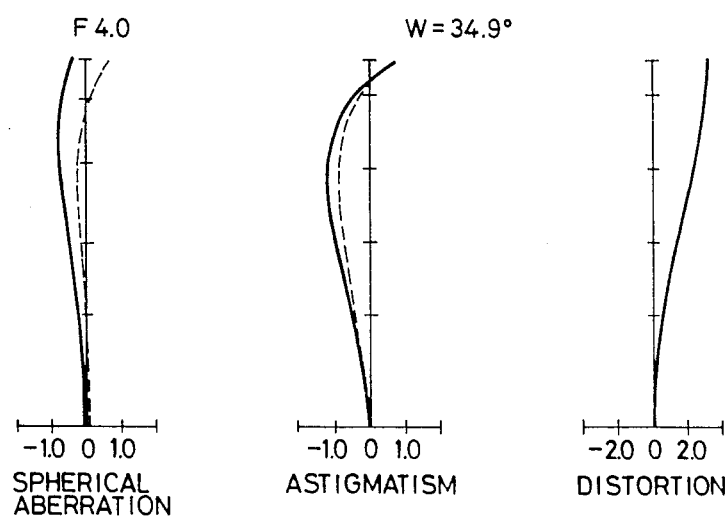
Figure 30A:
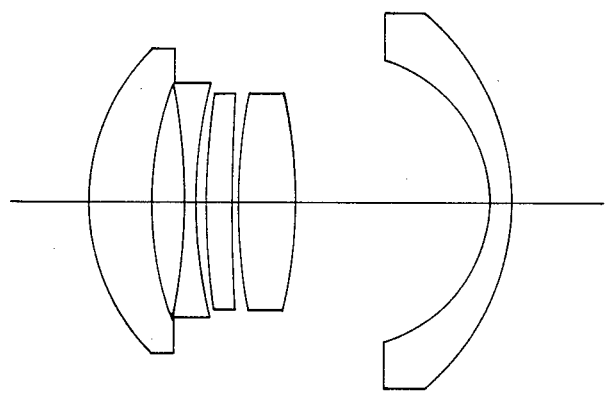
Figure 30B:
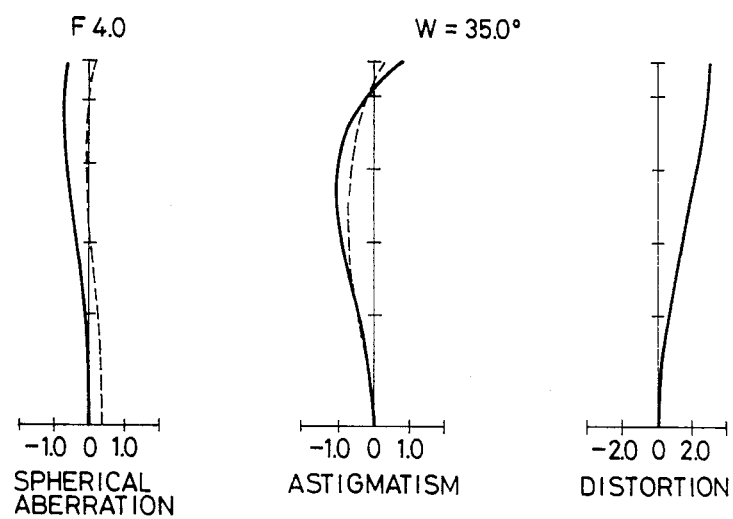
Figure 31A:
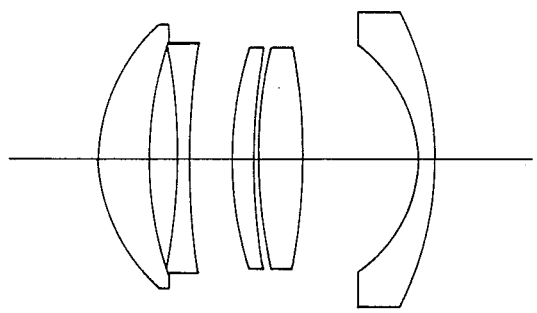
Figure 31B:
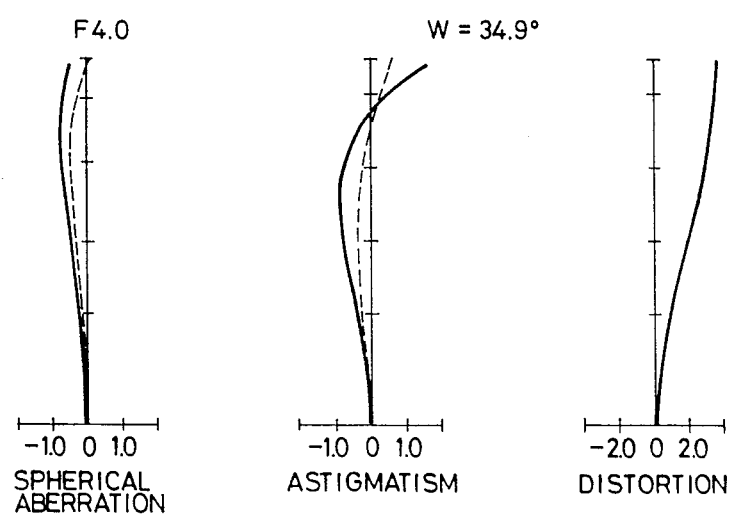
Figure 32A:
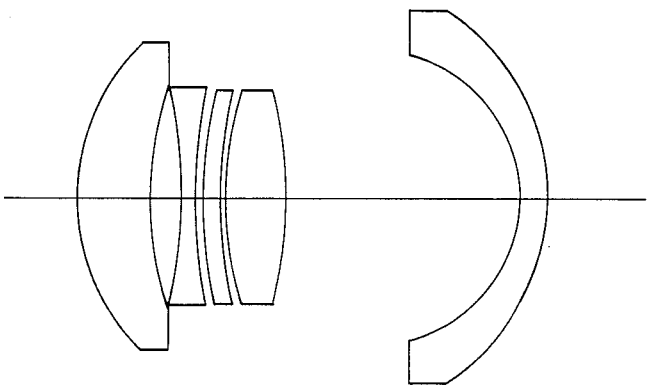
Figure 32B:
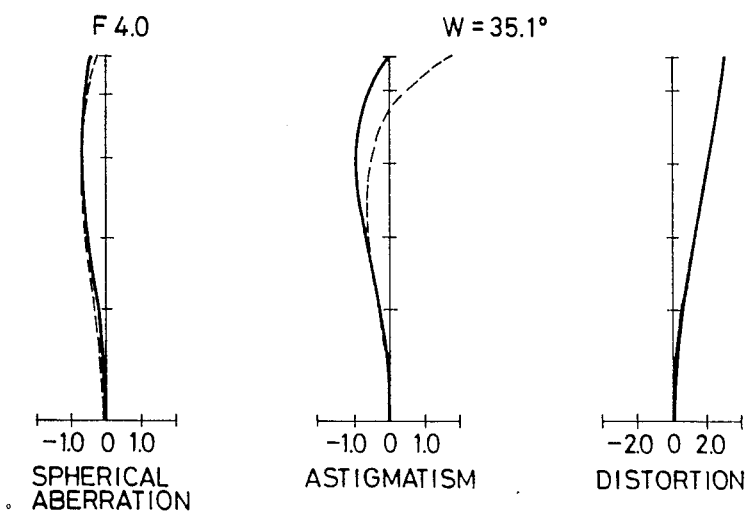
Figure 33A:
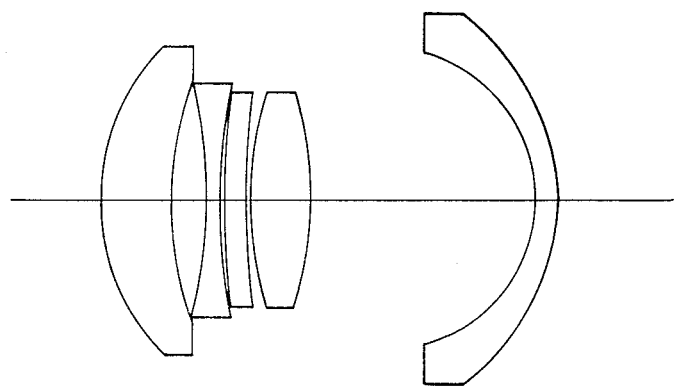
Figure 33B:
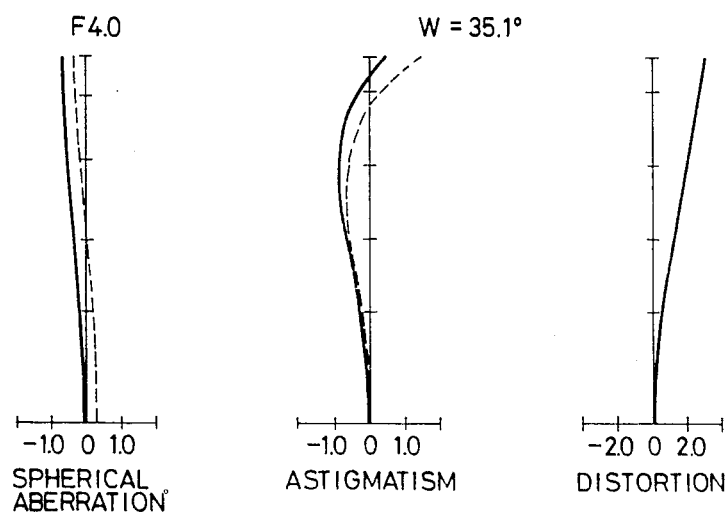

Embodiments of a lens system according to the present invention will be described hereinafter.

Embodiments 1 to 21 illustrate examples wherein a third lens $L_3$ comprises a single lens or a cemented lens. Embodiments 1 to 8 and embodiments 9 to 10 illustrate examples which use two aspherical surfaces and three aspherical surfaces, respectively. Among them, in the embodiment 8, a third lens comprises a cemented lens for achromatism.

Embodiments 13, 15 and 18 to 21 includes some examples in which the displacement direction of the surface is not in accordance with the conditions (6) to (13) since aspherical surfaces are introduced into three surfaces. Among them, embodiments 18 to 21 are in accordance with the conditions (14) and (15).

In tables, R designates the radius of curvature; D, the spacing between refracting surfaces; N, the refractive index, $\nu$, the Abbe number; W, the angle of view; $f_B$, the back-focus; K, the conical constant; A, the coefficient of an aspherical surface; and $\Sigma D$, the overall length of lens.

Embodiment 1

| f = 100 | W = 35.6° | F 4.0 | |
|---|---|---|---|
| | R | D | N | $\nu$ |
| 1 | 26.826 | 9.33 | 1.62280 | 57.0 |
| 2 | 111.880 | 3.33 | | |
| 3 | −95.275 | 2.67 | 1.84666 | 23.9 |
| 4 | 45.833 | 3.00 | | |
| 5 | 54.366 | 5.67 | 1.59270 | 35.3 |
| 6 | −50.903 | 22.74 | | |
| 7 | −14.991 | 3.33 | 1.69680 | 55.5 |
| 8 | −18.930 | | | |

| Aspherical surface: 1 | $\Delta X_1(0.13f)/f = -0.3847 \times 10^{-3}$ |
|---|---|
| K = 0.0 | |
| A1 = 6.65277D−04 | P1 = 2.0000 |
| A2 = −2.42299D−07 | P2 = 4.0000 |
| A3 = 4.24465D−10 | P3 = 5.0000 |
| A4 = −7.61811D−10 | P4 = 6.0000 |
| A5 = −2.55577D−11 | P5 = 7.0000 |
| A6 = −5.76347D−13 | P6 = 8.0000 |
| A7 = −1.10042D−14 | P7 = 9.0000 |
| A8 = −1.92674D−16 | P8 = 10.0000 |

| Aspherical surface: 8 | $\Delta X_8(0.14f)/f = -0.3082 \times 10^{-2}$ |
|---|---|
| K = 0.0 | |
| A1 = 2.50649D−03 | P1 = 2.0000 |
| A2 = −6.34509D−06 | P2 = 4.0000 |
| A3 = 8.66364D−07 | P3 = 5.0000 |
| A4 = −2.78035D−08 | P4 = 6.0000 |
| A5 = −2.07165D−10 | P5 = 7.0000 |
| A6 = 2.17422D−12 | P6 = 8.0000 |
| A7 = 7.11934D−13 | P7 = 9.0000 |
| A8 = 1.13497D−14 | P8 = 10.0000 |

| $f_{1.2.3}$ = 65.67 | $\Sigma D$ = 50.07 |
|---|---|
| $f_4$ = −98.79 | Telephoto ratio = 0.9269 |
| $f_B$ = 42.62 | |

Embodiment 2

| f = 100 | W = 35.6° | F 4.0 | |
|---|---|---|---|
| | R | D | N | $\nu$ |
| 1 | 25.387 | 9.33 | 1.62280 | 57.0 |
| 2 | 44.798 | 3.33 | | |
| 3 | −118.415 | 2.67 | 1.84666 | 23.9 |
| 4 | 45.426 | 3.00 | | |
| 5 | 55.596 | 5.67 | 1.59270 | 35.3 |
| 6 | −59.948 | 22.75 | | |
| 7 | −14.933 | 3.33 | 1.69680 | 55.5 |
| 8 | −18.723 | | | |

| Aspherical surface: 2 | $\Delta X_2(0.13f)/f = 0.7589 \times 10^{-3}$ |
|---|---|
| K = 0.0 | |
| A1 = −5.57204D−03 | P1 = 2.0000 |
| A2 = 1.98838D−06 | P2 = 4.0000 |
| A3 = −6.33022D−08 | P3 = 5.0000 |
| A4 = 5.57988D−10 | P4 = 6.0000 |
| A5 = 3.93575D−11 | P5 = 7.0000 |
| A6 = 9.57151D−13 | P6 = 8.0000 |
| A7 = 1.75406D−14 | P7 = 9.0000 |
| A8 = 2.80037D−16 | P8 = 10.0000 |

| Aspherical surface: 8 | $\Delta X_8(0.14f)/f = -0.3020 \times 10^{-2}$ |
|---|---|
| K = 0.0 | |
| A1 = 2.39772D−03 | $\beta$; = 2.0000 |
| A2 = −6.27124D−06 | P2 = 4.0000 |
| A3 = 8.70726D−07 | P3 = 5.0000 |
| A4 = −2.75923D−08 | P4 = 6.0000 |
| A5 = −2.01539D−10 | P5 = 7.0000 |
| A6 = 2.29204D−12 | P6 = 8.0000 |
| A7 = 7.14090D−13 | P7 = 9.0000 |
| A8 = 1.13852D−14 | P8 = 10.0000 |

| $f_{1.2.3}$ = 66.48 | $\Sigma D$ = 50.08 |

-continued

| f = 100 | W = 35.6° | F 4.0 |
|---|---|---|
| $f_4 = -103.30$ | Telephoto ratio = 0.9270 | |
| $f_B = 42.62$ | | |

Embodiment 3

| f = 100 | W = 35.5° | F 4.0 | |
|---|---|---|---|
| | R | D | N | $\nu$ |
| 1 | 22.778 | 9.33 | 1.62280 | 57.0 |
| 2 | 48.590 | 3.33 | | |
| 3 | 30.540 | 2.67 | 1.84666 | 23.9 |
| 4 | 40.528 | 3.00 | | |
| 5 | 43.424 | 5.67 | 1.59270 | 35.3 |
| 6 | −37.816 | 18.40 | | |
| 7 | −17.458 | 3.33 | 1.69680 | 55.5 |
| 8 | −23.851 | | | |
| Aspherical surface: 3 | $\Delta X_3(0.1f)/f = -0.6483 \times 10^{-3}$ | | | |

K = 0.0
A1 = −2.12847D−02   P1 = 2.0000
A2 = −1.30628D−05   P2 = 4.0000
A3 = 2.36300D−07    P3 = 5.0000
A4 = 1.68427D−08    P4 = 6.0000
A5 = −2.87031D−09   P5 = 7.0000
A6 = 1.92758D−11    P6 = 8.0000
A7 = 3.38873D−12    P7 = 9.0000
A8 = 1.11824D−13    P8 = 10.0000
Asphrical surface: 8   $\Delta X_9(0.14f)/f = -0.1117 \times 10^{-2}$ K = 0.0
A1 = 2.91382D−03    P1 = 2.0000
A2 = −3.21450D−06   P2 = 4.0000
A3 = 6.97411D−07    P3 = 5.0000
A4 = −3.00678D−08   P4 = 6.0000
A5 = −6.84978D−11   P5 = 7.0000
A6 = 1.08261D−11    P6 = 8.0000
A7 = 1.00543D−12    P7 = 9.0000
A8 = 1.90681D−14    P8 = 10.0000

| $f_{1.2.3} = 59.56$ | $\Sigma D = 45.73$ |
|---|---|
| $f_4 = -78.21$ | Telephoto ratio = 0.9270 |
| $f_B = 46.97$ | |

Embodiment 4

| f = 100 | W = 24.4° | F 4.0 | |
|---|---|---|---|
| | R | D | N | $\nu$ |
| 1 | 23.314 | 9.33 | 1.62280 | 57.0 |
| 2 | 66.942 | 3.33 | | |
| 3 | −115.005 | 2.67 | 1.84666 | 23.9 |
| 4 | 36.535 | 3.00 | | |
| 5 | 56.237 | 5.67 | 1.59270 | 35.3 |
| 6 | −49.885 | 18.62 | | |
| 7 | −15.016 | 3.33 | 1.69680 | 55.5 |
| 8 | −19.209 | | | |
| Aspherical surface: 4 | $\Delta X_4(0.1f)/f = 0.3594 \times 10^{-3}$ | | | |

K = 0.0
A1 = −2.48961D−03   P1 = 2.0000
A2 = 1.76988D−06    P2 = 4.0000
A3 = 5.84745D−08    P3 = 5.0000
A4 = 2.19216D−10    P4 = 6.0000
A5 = −5.40366D−12   P5 = 7.0000
A6 = −1.34142D−13   P6 = 8.0000
A7 = −1.99220D−15   P7 = 9.0000
A8 = −2.43082D−17   P8 = 10.0000
Aspherical surface: 8   $\Delta X_8(0.14f)/f = -0.2343 \times 10^{-2}$ K = 0.0
A1 = 2.01914D−03    P1 = 2.0000
A2 = −3.57968D−06   P2 = 4.0000
A3 = 7.32965D−07    P3 = 5.0000
A4 = −3.33395D−08   P4 = 6.0000
A5 = −2.11258D−10   P5 = 7.0000
A6 = 7.11969D−12    P6 = 8.0000
A7 = 9.29020D−13    P7 = 9.0000

-continued

| f = 100 | W = 24.4° | F 4.0 |
|---|---|---|
| A8 = 1.77127D−14 | P8 = 10.0000 | |
| $f_{1.2.3} = 64.38$ | $\Sigma D = 45.95$ | |
| $f_4 = -101.08$ | Telephoto ratio = 0.9265 | |
| $f_B = 46.70$ | | |

Embodiment 5

| f = 100 | W = 35.7° | F 40 | |
|---|---|---|---|
| | R | D | N | $\nu$ |
| 1 | 23.512 | 9.33 | 1.62280 | 57.0 |
| 2 | 69.610 | 3.33 | | |
| 3 | −101.022 | 2.67 | 1.84666 | 23.9 |
| 4 | 48.977 | 3.00 | | |
| 5 | 57.321 | 5.67 | 1.59270 | 35.3 |
| 6 | −47.562 | 18.91 | | |
| 7 | −15.594 | 3.33 | 1.69680 | 55.5 |
| 8 | −19.700 | | | |
| Aspherical surface: 5 | $\Delta X_5(0.1f)/f = -0.5234 \times 10^{-3}$ | | | |

K = 0.0
A1 = −9.59778D−04   P1 = 2.0000
A2 = −5.64421D−06   P2 = 4.0000
A3 = 1.47998D−08    P3 = 5.0000
A4 = 5.45863D−10    P4 = 6.0000
A5 = 6.87770D−12    P5 = 7.0000
A6 = 6.77105D−14    P6 = 8.0000
A7 = 5.88262D−16    P7 = 9.0000
A8 = 4.69128D−18    P8 = 10.0000
Aspherical surface: 8   $\Delta X_8(0.14f)/f = -0.2169 \times 10^{-2}$ K = 0.0
A1 = 2.42989D−03    P1 = 2.0000
A2 = −3.87979D−06   P2 = 4.0000
A3 = 8.02987D−07    P3 = 5.0000
A4 = −3.21202D−08   P4 = 6.0000
A5 = −2.05100D−10   P5 = 7.0000
A6 = 6.81212D−12    P6 = 8.0000
A7 = 9.15937D−13    P7 = 9.0000
A8 = 1.73678D−14    P8 = 10.0000

| $f_{1.2.3} = 64.63$ | $\Sigma D = 46.24$ |
|---|---|
| $f_4 = -101.10$ | Telephoto ratio = 0.9270 |
| $f_B = 46.46$ | |

Embodiment 6

| f = 100 | W = 35.6° | F 4.0 | |
|---|---|---|---|
| | R | D | N | $\nu$ |
| 1 | 23.529 | 9.33 | 1.62280 | 57.0 |
| 2 | 66.399 | 3.33 | | |
| 3 | −96.597 | 2.67 | 1.84666 | 23.9 |
| 4 | 49.246 | 3.00 | | |
| 5 | 55.134 | 5.67 | 1.59270 | 35.3 |
| 6 | −46.736 | 19.48 | | |
| 7 | −16.149 | 3.33 | 1.69680 | 55.5 |
| 8 | −20.838 | | | |
| Aspherical surface: 5 | $\Delta X_5(0.1f)/f = -0.5681 \times 10^{-3}$ | | | |

K = 0.0
A1 = −7.21411D−04   P1 = 2.0000
A2 = −6.09173D−06   P2 = 4.0000
A3 = 1.72427D−08    P3 = 5.0000
A4 = 6.12968D−10    P4 = 6.0000
A5 = 7.88608D−12    P5 = 7.0000
A6 = 8.14185D−14    P6 = 8.0000
A7 = 7.64055D−16    P7 = 9.0000
A8 6.83360D−18      P8 = 10.0000
Aspherical surface: 7   $\Delta X_7(0.13f)/f = 0.5235 \times 10^{-2}$ K = 0.0
A1 = −2.56164D−03   P1 = 2.0000
A2 = −1.71989D−06   P2 = 4.0000
A3 = −6.88711D−08   P3 = 5.0000
A4 = −7.55129D−10   P4 = 6.0000

-continued

| | f = 100 | W = 35.6° | F 4.0 | |
|---|---|---|---|---|
| A5 = −6.79709D−12 | | P5 = 7.0000 | | |
| A6 = −6.32490D−14 | | P6 = 8.0000 | | |
| A7 = −7.17730D−16 | | P7 = 9.0000 | | |
| A8 = −1.24750D−17 | | P8 = 10.0000 | | |
| $f_{1,2,3}$ = 64.08 | | $\Sigma D$ = 46.81 | | |
| $f_4$ = −97.95 | | Telephoto ratio = 0.9272 | | |
| $f_B$ = 45.91 | | | | |

Embodiment 7

| | f = 100 | W = 35.7° | F 4.0 | |
|---|---|---|---|---|
| | R | D | N | ν |
| 1 | 24.967 | 9.33 | 1.62280 | 57.0 |
| 2 | 73.358 | 3.33 | | |
| 3 | −81.702 | 2.67 | 1.84666 | 23.9 |
| 4 | 52.896 | 3.00 | | |
| 5 | 51.170 | 5.67 | 1.59270 | 35.3 |
| 6 | −36.000 | 22.20 | | |
| 7 | −16.128 | 3.33 | 1.69680 | 55.5 |
| 8 | −20.919 | | | |

Aspherical surface: 6   $\Delta X_6(0.1f)/f = 0.4116 \times 10^{-3}$

K = 0.0
A1 = 3.47895D−03   P1 = 2.0000
A2 = 8.45750D−06   P2 = 4.0000
A3 = −2.95562D−07   P3 = 5.0000
A4 = 1.52616D−09   P4 = 6.0000
A5 = 8.02617D−11   P5 = 7.0000
A6 = 1.37894D−12   P6 = 8.0000
A7 = 1.78975D−14   P7 = 9.0000
A8 = 2.02767D−16   P8 = 10.0000

Aspherical surface: 8   $\Delta X_8(0.14f)/f = -0.1997 \times 10^{-2}$

K = 0.0
A1 = 2.56464D−03   P1 = 2.0000
A2 = −5.06717D−06   P2 = 4.0000
A3 = 8.33672D−07   P3 = 5.0000
A4 = −2.90143D−08   P4 = 6.0000
A5 = −2.33228D−10   P5 = 7.0000
A6 = 1.77498D−12   P6 = 8.0000
A7 = 7.08209D−13   P7 = 9.0000
A8 = 1.13688D−14   P8 = 10.0000

$f_{1,2,3}$ = 64.21   $\Sigma D$ = 49.53
$f_4$ = −91.38   Telephoto ratio: 0.9271
$f_B$ = 43.18

Embodiment 8

| | f = 100 | W = 35.7° | F 4.0 | |
|---|---|---|---|---|
| | R | D | N | ν |
| 1 | 23.422 | 9.33 | 1.62280 | 57.0 |
| 2 | 70.625 | 3.33 | | |
| 3 | −93.604 | 2.67 | 1.84666 | 23.9 |
| 4 | 46.465 | 3.00 | | |
| 5 | 56.339 | 4.50 | 1.59270 | 35.3 |
| 6 | −31.977 | 1.17 | 1.74950 | 35.3 |
| 7 | −42.929 | 18.95 | | |
| 8 | −15.685 | 3.33 | 1.69680 | 55.5 |
| 9 | −20.130 | | | |

Aspherical surface: 5   $\Delta X_5(0.1f)/f = -0.4670 \times 10^{-3}$

K = 0.0
A1 = 4.94611D−05   P1 = 2.0000
A2 = −4.87911D−06   P2 = 4.0000
A3 = 1.71412D−08   P3 = 5.0000
A4 = 4.46202D−10   P4 = 6.0000
A5 = 4.61797D−12   P5 = 7.0000
A6 = 3.48215D−14   P6 = 8.0000
A7 = 1.86574D−16   P7 = 9.0000
A8 = 2.30924D−19   P8 = 10.0000

Aspherical surface: 9   $\Delta X_9(0.14f)/f = -0.1948 \times 10^{-2}$

K = 0.0
A1 = 2.35661D−03   P1 = 2.0000
A2 = −3.60474D−06   P2 = 4.0000
A3 = 7.93398D−07   P3 = 5.0000
A4 = −3.28026D−08   P4 = 6.0000
A5 = −2.29990D−10   P5 = 7.0000
A6 = 6.11902D−12   P6 = 8.0000
A7 = 8.99651D−13   P7 = 9.0000
A8 = 1.70282D−14   P8 = 10.0000

$f_{1,2,3,4}$ = 63.77   $\Sigma D$ = 46.28
$f_5$ = −96.52   Telephoto ratio = 0.9269
$f_B$ = 46.41

Embodiment 9

| | f = 100 | W = 35.8° | F 4.0 | |
|---|---|---|---|---|
| | R | D | N | ν |
| 1 | 24.634 | 6.47 | 1.56883 | 56.3 |
| 2 | 102.309 | 3.23 | | |
| 3 | −76.314 | 1.62 | 1.80518 | 25.4 |
| 4 | 80.929 | 6.10 | | |
| 5 | 75.546 | 3.87 | 1.60717 | 40.3 |
| 6 | −50.333 | 20.52 | | |
| 7 | −17.200 | 2.50 | 1.63854 | 55.4 |
| 9 | −24.098 | | | |

Aspherical surface: 4   $\Delta X_4(0.1f)/f = 0.1555 \times 10^{-3}$

K = 0.0
A1 = 8.69939D−04   P1 = 2.0000
A2 = 1.38421D−06   P2 = 4.0000
A3 = 2.85950D−09   P3 = 6.0000
A4 = 4.72626D−14   P4 = 8.0000
A5 = −3.15977D−17   P5 = 10.0000

Aspherical surface: 6   $\Delta X_6(0.1f)/f = 0.3305 \times 10^{-4}$

K = 0.0
A1 = −3.97745D−04   P1 = 2.0000
A2 = 4.86804D−07   P2 = 4.0000
A3 = −2.78992D−09   P3 = 6.0000
A4 = −4.10665D−13   P4 = 8.0000
A5 = −4.31447D−17   P5 = 10.0000

Aspherical surface: 8   $\Delta X_9(0.14f)/f = -0.9116 \times 10^{-3}$

K = 0.0
A1 = 2.67076D−03   P1 = 2.0000
A2 = 1.84476D−06   P2 = 4.0000
A3 = −9.06308D−10   P3 = 6.0000
A4 = 1.58951D−13   P4 = 8.0000
A5 = −6.06220D−17   P5 = 10.0000

$f_{1,2,3}$ = 59.79   $\Sigma D$ = 44.30
$f_4$ = −78.56   Telephoto ratio = 0.9269
$f_B$ = 48.39

Embodiment 10

| | f = 100 | W = 36.0° | F 4.0 | |
|---|---|---|---|---|
| | R | D | N | ν |
| 1 | 24.574 | 6.47 | 1.56883 | 56.3 |
| 2 | 97.945 | 3.23 | | |
| 3 | −73.212 | 1.62 | 1.80518 | 25.4 |
| 4 | 80.620 | 6.10 | | |
| 5 | 76.396 | 3.87 | 1.60717 | 40.3 |
| 6 | −50.391 | 20.52 | | |
| 7 | −17.153 | 2.50 | 1.63854 | 55.4 |
| 8 | −23.722 | | | |

Aspherical surface: 5   $\Delta X_5(0.1f)/f = -0.1358 \times 10^{-3}$

K = 0.0
A1 = −2.54556D−04   P1 = 2.0000
A2 = −1.39147D−06   P2 = 4.0000
A3 = 1.17392D−11   P3 = 6.0000
A4 = 7.41638D−15   P4 = 8.0000
A5 = 7.47286D−19   P5 = 10.0000

-continued

| f = 100 | W = 36.0° | F 4.0 | |
|---|---|---|---|

| Aspherical surface: 6 | $\Delta_6(0.1f)/f = 0.6461 \times 10^{-4}$ |
|---|---|

K = 0.0
A1 = −1.07394D−04    P1 = 2.0000
A2 = 5.94152D−07     P2 = 4.0000
A3 = 1.85550D−10     P3 = 6.0000
A4 = 1.85067D−14     P4 = 8.0000
A5 = 1.92440D−18     P5 = 10.0000

| Aspherical surface: 8 | $\Delta X_{14}(0.14f)/f = -0.98884 \times 10^{-3}$ |
|---|---|

K = 0.0
A1 = 2.76633D−03     P1 = 2.0000
A2 = 2.21084D−06     P2 = 4.0000
A3 = −1.94200D−09    P3 = 6.0000
A4 = −1.18246D−12    P4 = 8.0000

$f_{1.2.3} = 60.20$    $\Sigma D = 44.30$
$f_4 = -79.91$    Telephoto ratio = 0.9260
$f_B = 48.30$

Embodiment 11

| f = 100 | W = 35.0° | F 4.0 | |
|---|---|---|---|
| | R | D | N | ν |
|---|---|---|---|---|
| 1 | 25.317 | 8.33 | 1.60311 | 60.7 |
| 2 | 54.926 | 3.24 | | |
| 3 | −53.996 | 1.62 | 1.84666 | 23.9 |
| 4 | 93.997 | 3.64 | | |
| 5 | 72.903 | 6.33 | 1.62004 | 36.3 |
| 6 | −48.558 | 21.79 | | |
| 7 | −17.232 | 2.59 | 1.51633 | 64.1 |
| 8 | −28.060 | | | |

| Aspherical surface: 1 | $\Delta X_1(0.13f)/f = -0.9740 \times 10^{-4}$ |
|---|---|

K = −2.08874D−02
A1 = 5.04143D−05     P1 = 2.0000
A2 = −3.18772D−08    P2 = 4.0000
A3 = −1.31991D−09    P3 = 5.0000
A4 = −2.03248D−12    P4 = 6.0000
A5 = 2.46655D−13     P5 = 7.0000
A6 = 6.24844D−15     P6 = 8.0000
A7 = 1.12941D−16     P7 = 9.0000
A8 = 1.81086D−18     P8 = 10.0000

| Aspherical surface: 3 | $\Delta X_3(0.1f)/f = -0.2425 \times 10^{-3}$ |
|---|---|

K = −2.49709D−02
A1 = 3.32366D−03     P1 = 2.0000
A2 = −6.76348D−07    P2 = 4.0000
A3 = −1.71935D−07    P3 = 5.0000
A4 = 3.60669D−09     P4 = 6.0000
A5 = 1.45611D−10     P5 = 7.0000
A6 = 3.31067D−12     P6 = 8.0000
A7 = 6.56682D−14     P7 = 9.0000
A8 = 1.26619D−15     P8 = 10.0000

| Aspherical surface: 8 | $\Delta X_8(0.14f)/f = -0.1090 \times 10^2$ |
|---|---|

K = −1.11373D+00
A1 = 9.91453D−04     P1 = 2.0000
A2 = −5.21808D−06    P2 = 3.0000
A3 = −5.26807D−06    P3 = 4.0000
A4 = −2.10519D−07    P4 = 5.0000
A5 = 7.66812D−10     P5 = 6.0000
A6 = 4.91284D−11     P6 = 7.0000
A7 = −1.09041D−11    P7 = 8.0000
A8 = −1.40019D−13    P8 = 9.0000
A9 = −7.26174D−15    P9 = 10.0000

$f_{1.2.3} = 62.98$
$f_4 = -85.48$
fB = 45.88
$\Sigma D = 47.54$
Telephoto ratio = 0.9342

Embodiment 12

| f = 100 | W = 35.1° | F 4.0 | |
|---|---|---|---|
| | R | D | N | ν |
|---|---|---|---|---|
| 1 | 25.319 | 8.33 | 1.60311 | 60.7 |
| 2 | 55.604 | 3.24 | | |
| 3 | −54.142 | 1.62 | 1.84666 | 23.9 |
| 4 | 97.828 | 3.64 | | |
| 5 | 73.446 | 6.33 | 1.62004 | 36.3 |
| 6 | −47.656 | 21.79 | | |
| 7 | −17.234 | 2.59 | 1.51633 | 64.1 |
| 8 | −28.121 | | | |

| Aspherical surface: 2 | $\Delta X_2(0.13f)/f = 0.1027 \times 10^{-3}$ |
|---|---|

K = 3.47226D−02
A1 = 1.56933D−04     P1 = 2.0000
A2 = 3.64147D−07     P2 = 4.0000
A3 = 1.04115D−09     P3 = 5.0000
A4 = −1.82768D−11    P4 = 6.0000
A5 = −4.66723D−13    P5 = 7.0000
A6 = −7.46477D−15    P6 = 8.0000
A7 = −1.02910D−16    P7 = 9.0000
A8 = −1.32340D−18    P8 = 10.0000

| Ashperical surface: 3 | $\Delta X_3(0.1f)f = -0.2519 \times 10^{-3}$ |
|---|---|

K = −1.13649D−02
A1 = 3.08014D−03     P1 = 2.0000
A2 = −7.50059D−07    P2 = 4.0000
A3 = −1.75167D−07    P3 = 5.0000
A4 = 3.54366D−09     P4 = 6.0000
A5 = 1.44689D−10     P5 = 7.0000
A6 = 3.29891D−12     P6 = 8.0000
A7 = 6.56684D−14     P7 = 9.0000
A8 = 1.26464D−15     P8 = 10.0000

| Aspherical surface: 8 | $\Delta X_8(0.14f)/f = -0.1022 \times 10^{-2}$ |
|---|---|

K = −1.14811D+00
A1 = 1.00135D−03     P1 = 2.0000
A2 = −5.21808D−06    P2 = 3.0000
A3 = −5.21873D−06    P3 = 4.0000
A4 = −2.10519D−07    P4 = 5.0000
A5 = 7.28388D−10     P5 = 6.0000
A6 = 4.91285D−11     P6 = 7.0000
A7 = −1.08772D−11    P7 = 8.0000
A8 = −1.40019D−13    P8 = 9.0000
A9 = −7.24171D−15    P9 = 10.0000

$f_{1.2.3} = 62.82$
$f_4 = -85.13$
$f_B = 46.03$
$\Sigma_D = 47.54$
Telephoto ratio = 0.9357

Embodiment 13

| f = 100 | W = 35.1° | F 4.0 | |
|---|---|---|---|
| | R | D | N | ν |
|---|---|---|---|---|
| 1 | 24.480 | 8.33 | 1.60311 | 60.7 |
| 2 | 54.317 | 3.24 | | |
| 3 | −50.564 | 1.62 | 1.84666 | 23.9 |
| 4 | 74.154 | 3.64 | | |
| 5 | 70.278 | 6.33 | 1.62004 | 36.3 |
| 6 | −51.826 | 21.77 | | |
| 7 | −16.427 | 2.59 | 1.49200 | 55.0 |
| 8 | −24.450 | | | |

| Aspherical surface: 3 | $\Delta X_3(0.1f)/f = -0.2868 \times 10^{-3}$ |
|---|---|

K = 2.97195D−02
A1 = 4.98558D−03     P1 = 2.0000
A2 = −1.11677D−03    P2 = 4.0000
A3 = −1.45536D−07    P3 = 5.0000
A4 = 4.08159D−09     P4 = 6.0000
A5 = 1.51845D−10     P5 = 7.0000
A6 = 3.38403D−12     P6 = 8.0000
A7 = 6.67456D−14     P7 = 9.0000
A8 = 1.27504D−15     P8 = 10.0000

| Aspherical surface: 7 | $\Delta X_7(0.13f)/f = 0.6270 \times 10^{-2}$ |
|---|---|

K = −7.81760D−02
A1 = −2.37403D−03    P1 = 2.0000

-continued

| f = 100 | W = 35.1° | F 4.0 |
|---|---|---|
| A2 = −7.21552D−07 | P2 = 4.0000 | |
| A3 = −1.08063D−08 | P3 = 5.0000 | |
| A4 = −1.17586D−10 | P4 = 6.0000 | |
| A5 = −7.95713D−13 | P5 = 7.0000 | |
| A6 = 2.52428D−15 | P6 = 8.0000 | |
| A7 = 5.23919D−18 | P7 = 10.0000 | |
| Aspherical surface: 8 | $\Delta X_8(0.14\ f)/f = 0.8709 \times 10^{-3}$ | |
| K = −1.09095D+00 | | |
| A1 = −5.34482D−05 | P1 = 2.0000 | |
| A2 = −5.21884D−06 | P2 = 3.0000 | |
| A3 = −5.28634D−06 | P3 = 4.0000 | |
| A4 = −2.10520D−07 | P4 = 5.0000 | |
| A5 = 5.27104D−10 | P5 = 6.0000 | |
| A6 = 4.91287D−11 | P6 = 7.0000 | |
| A7 = −1.10169D−11 | P7 = 8.0000 | |
| A8 = −1.40020D−13 | P8 = 9.0000 | |
| A9 = −7.29674D−15 | P9 = 10.0000 | |

$f_{1.2.3} = 64.2$
$f_4 = -91.06$
$f_B = 45.67$
$\Sigma_D = 47.52$
Telephoto ratio = 0.9319

Embodiment 14

| f = 100 | W = 35.1° | F 4.0 | |
|---|---|---|---|
| | R | D | N | ν |
| 1 | 21.433 | 7.39 | 1.51633 | 64.1 |
| 2 | 65.752 | 2.87 | | |
| 3 | −60.623 | 1.43 | 1.75520 | 27.5 |
| 4 | 49.645 | 3.23 | | |
| 5 | 53.884 | 5.61 | 1.62004 | 36.3 |
| 6 | −48.565 | 18.63 | | |
| 7 | −15.629 | 2.30 | 1.51633 | 64.1 |
| 8 | −27.375 | | | |
| Aspherical surface: 3 | $\Delta X_3(0.1\ f)/f = -0.1034 \times 10^{-3}$ | | | |
| K = −3.72924D−02 | | | | |
| A1 = 1.08233D−03 | P1 = 2.0000 | | | |
| A2 = −2.81942D−05 | P2 = 3.0000 | | | |
| A3 = 4.22689D−06 | P3 = 4.0000 | | | |
| A4 = −2.75472D−07 | P4 = 5.0000 | | | |
| A5 = 2.36734D−09 | P5 = 6.0000 | | | |
| A6 = 1.9−291D−10 | P6 = 7.0000 | | | |
| A7 = 5.02400D−12 | P7 = 8.0000 | | | |
| A8 = 1.02079D−13 | P8 = 9.0000 | | | |
| A9 = 1.85997D−15 | P9 = 10.0000 | | | |
| Aspherical surface: 5 | $\Delta X_5(0.1\ f)/f = -0.2291 \times 10^{-3}$ | | | |
| K = −1.95486D−01 | | | | |
| A1 = 6.71218D−04 | P1 = 2.0000 | | | |
| A2 = −1.57691D−06 | P2 = 4.0000 | | | |
| A3 = −3.10099D−08 | P3 = 5.0000 | | | |
| A4 = −4.47223D−10 | P4 = 6.0000 | | | |
| A5 = −5.43492D−12 | P5 = 7.0000 | | | |
| A6 = −5.85634D−14 | P6 = 8.0000 | | | |
| A7 = −4.99232D−18 | P7 = 10.0000 | | | |
| Aspherical surface: 8 | $\Delta X_8(0.14\ f)/f = -0.1462 \times 10^{-2}$ | | | |
| K = −8.22201D−02 | | | | |
| A1 = −1.61780D−03 | P1 = 2.0000 | | | |
| A2 = −3.21257D−05 | P2 = 3.0000 | | | |
| A3 = −2.63779D−07 | P3 = 4.0000 | | | |
| A5 = −1.57399D−09 | P5 = 6.0000 | | | |
| A6 = 7.99701D−11 | P6 = 7.0000 | | | |
| A7 = −2.07092D−11 | P7 = 8.0000 | | | |
| A8 = −5.72539D−14 | P8 = 9.0000 | | | |
| A9 = −8.36360D−15 | P9 = 10.0000 | | | |

$f_{1.2.3} = 60.91$
$f_4 = -87.12$
$f_B = 51.54$
$\Sigma_D = 41.46$
Telephoto ratio = 0.93

Embodiment 15

| f = 100 | W = 35.6° | F 4.0 | |
|---|---|---|---|
| | R | D | N | ν |
| 1 | 30.501 | 5.71 | 1.51633 | 64.1 |
| 2 | 69.875 | 2.86 | | |
| 3 | −72.993 | 1.43 | 1.80518 | 25.4 |
| 4 | 113.934 | 5.38 | | |
| 5 | 57.428 | 3.43 | 1.62004 | 36.3 |
| 6 | −59.075 | 18.80 | | |
| 7 | −15.114 | 2.28 | 1.69680 | 55.5 |
| 8 | −31.924 | | | |
| Aspherical surface: 1 | $\Delta X_1(0.13\ f)/f = -0.3860 \times 10^{-3}$ | | | |
| K = 3.16046D−01 | | | | |
| A1 = 6.03290D−03 | P1 = 2.0000 | | | |
| A2 = −1.84034D−05 | P2 = 3.0000 | | | |
| A3 = 7.06936D−06 | P3 = 4.0000 | | | |
| A4 = −1.28109D−07 | P4 = 5.0000 | | | |
| A5 = 1.02274D−08 | P5 = 6.0000 | | | |
| A6 = 1.41472D−10 | P6 = 7.0000 | | | |
| A7 = −4.26684D−12 | P7 = 8.0000 | | | |
| A8 = −2.63690D−13 | P8 = 9.0000 | | | |
| A9 = −8.49444D−15 | P9 = 10.0000 | | | |
| Aspherical surface: 3 | $\Delta X_3(0.1\ f)/f = -0.8480 \times 10^{-4}$ | | | |
| K = −2.19536D−01 | | | | |
| A1 = −9.30227D−04 | P1 = 2.0000 | | | |
| A2 = 5.16582D−07 | P2 = 4.0000 | | | |
| A3 = 6.96729D−11 | P3 = 5.0000 | | | |
| A4 = 7.65852D−10 | P4 = 6.0000 | | | |
| A5 = 2.47858D−11 | P5 = 7.0000 | | | |
| A6 = 5.05066D−13 | P6 = 8.0000 | | | |
| A7 = 1.25172D−16 | P7 = 10.0000 | | | |
| Aspherical surface: 8 | $\Delta X_8(0.14\ f)/f = -0.1330 \times 10^{-2}$ | | | |
| K = −2.80651D−01 | | | | |
| A1 = −6.32976D−03 | P1 = 2.0000 | | | |
| A2 = −2.44603D−05 | P2 = 3.0000 | | | |
| A3 = −8.09074D−06 | P3 = 4.0000 | | | |
| A4 = 7.85866D−09 | P4 = 5.0000 | | | |
| A5 = −7.82262D−09 | P5 = 6.0000 | | | |
| A6 = −3.42867D−10 | P6 = 7.0000 | | | |
| A7 = −3.40960D−11 | P7 = 8.0000 | | | |
| A8 = −3.57922D−13 | P8 = 9.0000 | | | |
| A9 = −1.26223D−14 | P9 = 10.0000 | | | |

$f_{1.2.3} = 56.55$
$f_4 = -73.79$
$f_B = 52.12$
$\Sigma_D = 39.89$
Telephoto ratio: = 0.9201

Embodiment 16

| f = 100 | W = 35.0° | F 4.0 | |
|---|---|---|---|
| | R | D | N | ν |
| 1 | 25.320 | 9.33 | 1.60311 | 60.7 |
| 2 | 55.337 | 3.24 | | |
| 3 | −54.130 | 1.62 | 1.84666 | 23.9 |
| 4 | 96.987 | 3.64 | | |
| 5 | 73.386 | 6.33 | 1.62004 | 36.3 |
| 6 | −47.064 | 21.79 | | |
| 7 | −17.232 | 2.59 | 1.51633 | 64.1 |
| 8 | −27.933 | | | |
| Aspherical surface: 3 | $\Delta X_3(0.1\ f)/f = -0.2542 \times 10^{-3}$ | | | |
| K = −7.80476D−03 | | | | |
| A1 = 3.15832D−03 | P1 = 2.0000 | | | |
| A2 = −7.66356D−07 | P2 = 4.0000 | | | |
| A3 = −1.74668D−07 | P3 = 5.0000 | | | |
| A4 = 3.54579D−09 | P4 = 6.0000 | | | |
| A5 = 1.44634D−10 | P5 = 7.0000 | | | |
| A6 = 3.29743D−12 | P6 = 8.0000 | | | |
| A7 = 6.57642D−14 | P7 = 9.0000 | | | |
| A8 = 1.26429D−15 | P8 = 10.0000 | | | |
| Aspherical surface: 6 | $\Delta X_6(0.1\ f)/f = 0.8300 \times 10^{-5}$ | | | |
| K = −2.47636D−02 | | | | |
| A1 = 3.30124D−04 | P1 = 2.0000 | | | |

-continued

| f = 100 W = 35.0° F 4.0 | |
|---|---|
| A2 = 1.17172D−07 | P2 = 4.0000 |
| A3 = 3.92609D−09 | P3 = 5.0000 |
| A4 = 7.15251D−11 | P4 = 6.0000 |
| A5 = 1.02301D−12 | P5 = 7.0000 |
| A6 = 1.29894D−14 | P6 = 8.0000 |
| A7 = 1.75108D−18 | P7 = 10.0000 |
| Aspherical surface: 8 | $\Delta X_8(0.14\,f)/f = -0.9197 \times 10^{-3}$ |
| K = −1.16547D+00 | |
| A1 = 1.00707D−03 | P1 = 2.0000 |
| A2 = −5.21807D−06 | P2 = 3.0000 |
| A3 = −5.18492D−06 | P3 = 4.0000 |
| A4 = −2.10518D−07 | P4 = 5.0000 |
| A5 = 7.36724D−10 | P5 = 6.0000 |
| A6 = 4.91282D−11 | P6 = 7.0000 |
| A7 = −1.08889D−11 | P7 = 8.0000 |
| A8 = −1.40018D−13 | P8 = 9.0000 |
| A9 = −7.25212D−15 | P9 = 10.0000 |

$f_{1,2,3} = 63.06$
$f_4 = -86.01$
$f_B = 45.99$
$\Sigma_D = 47.54$
Telephoto ratio = 0.9353

Embodiment 17

| | f = 100 | W = 35.0° | F 4.0 | |
|---|---|---|---|---|
| | R | D | N | ν |
| 1 | 25.480 | 8.33 | 1.60311 | 60.7 |
| 2 | 55.830 | 3.24 | | |
| 3 | −54.325 | 1.62 | 1.84666 | 23.9 |
| 4 | 101.538 | 3.64 | | |
| 5 | 73.231 | 6.33 | 1.62004 | 36.3 |
| 6 | −46.972 | 21.79 | | |
| 7 | −17.212 | 2.59 | 1.51633 | 64.1 |
| 8 | −28.395 | | | |

| Aspherical surface: 3 | $\Delta X_3(0.1\,f)/f = -0.2620 \times 10^{-3}$ |
|---|---|
| K = 0.0 | |
| A1 = 2.76615D−03 | P1 = 2.0000 |
| A2 = −8.32861D−07 | P2 = 4.0000 |
| A3 = −1.79476D−07 | P3 = 5.0000 |
| A4 = 3.47366D−09 | P4 = 6.0000 |
| A5 = 1.43781D−10 | P5 = 7.0000 |
| A6 = 3.28820D−12 | P6 = 8.0000 |
| A7 = 6.56684D−14 | P7 = 9.0000 |
| A8 = 1.26333D−15 | P8 = 10.0000 |
| Aspherical surface: 8 | $\Delta X_8(0.14\,f)/f = -0.9836 \times 10^{-3}$ |
| K = −1.19788D+00 | |
| A1 = 1.01475D−03 | P1 = 2.0000 |
| A2 = −5.21808D−06 | P2 = 3.0000 |
| A3 = −5.16207D−06 | P3 = 4.0000 |
| A4 = −2.10519D−07 | P4 = 5.0000 |
| A5 = 7.04564D−10 | P5 = 6.0000 |
| A6 = 4.91285D−11 | P6 = 7.0000 |
| A7 = −1.08790D−11 | P7 = 8.0000 |
| A8 = −1.40019D−13 | P8 = 9.0000 |
| A9 = −7.23875D−15 | P9 = 10.0000 |

$f_{1,2,3} = 62.42$   $\Sigma_D = 47.54$
$f_4 = -83.44$   Telephoto ratio = 0.9349
$f_B = 45.95$

Embodiment 18

| | f = 100 | W = 35.0° | F 4.0 | |
|---|---|---|---|---|
| | R | D | N | ν |
| 1 | 26.113 | 8.31 | 1.60311 | 60.7 |
| 2 | 52.142 | 3.39 | | |
| 3 | −84.056 | 2.03 | 1.84666 | 23.9 |
| 4 | 53.858 | 3.05 | | |
| 5 | 46.093 | 7.46 | 1.63636 | 35.4 |
| 6 | −54.212 | 27.38 | | |

-continued

| f = 100 W = 35.0° F 4.0 | | | | |
|---|---|---|---|---|
| 7 | −17.199 | 2.71 | 1.49200 | 55.0 |
| 8 | −18.298 | | | |

| Aspherical surface: 4 | $\Delta X_4(0.10\,f)/f = 0.3665 \times 10^{-3}$ |
|---|---|
| K = 7.25553D−01 | |
| A1 = −1.89353D−03 | P1 = 2.0000 |
| A2 = 1.63112D−06 | P2 = 4.0000 |
| A3 = 1.28730D−07 | P3 = 5.0000 |
| A4 = −1.17176D−09 | P4 = 6.0000 |
| A5 = −8.02144D−11 | P5 = 7.0000 |
| A6 = −1.69432D−12 | P6 = 8.0000 |
| A7 = −2.66045D−14 | P7 = 9.0000 |
| A8 = −3.69440D−16 | P8 = 10.0000 |
| Aspherical surface: 7 | $\Delta X_7(0.13\,f)/f = 0.2888 \times 10^{-1}$ |
| K = −3.03103D−02 | |
| A1 = −8.34305D−03 | P1 = 2.0000 |
| A2 = 2.10702D−06 | P2 = 4.0000 |
| A3 = 1.17386D−07 | P3 = 5.0000 |
| A4 = −5.49590D−09 | P4 = 6.0000 |
| A5 = −1.94141D−10 | P5 = 7.0000 |
| A6 = −4.16296D−12 | P6 = 8.0000 |
| A7 = −7.41826D−14 | P7 = 9.0000 |
| A8 = −1.19214D−15 | P8 = 10.0000 |
| Aspherical surface: 8 | $\Delta X_8(0.14\,f)/f = 0.5645 \times 10^{-2}$ |
| K = −1.31433D+00 | |
| A1 = 3.75089D−03 | P1 = 2.0000 |
| A2 = −5.87355D−06 | P2 = 4.0000 |
| A3 = −9.92000D−08 | P3 = 5.0000 |
| A4 = −2.54945D−09 | P4 = 6.0000 |
| A5 = −2.21999D−11 | P5 = 7.0000 |
| A6 = −7.18024D−12 | P6 = 8.0000 |
| A7 = 6.55420D−14 | P7 = 9.0000 |
| A8 = 9.02696D−16 | P8 = 10.0000 |

$f_{1,2,3} = 64.63$
$f_4 = -82.88$
$f_B = 39.82$
$\Sigma_D = 54.33$
Telephoto ratio: 0.9415

Embodiment 19

| | f = 100 | W = 35.0° | F 4.0 | |
|---|---|---|---|---|
| | R | D | N | ν |
| 1 | 25.548 | 8.19 | 1.60311 | 60.7 |
| 2 | 52.055 | 3.34 | | |
| 3 | −84.113 | 2.00 | 1.84666 | 23.9 |
| 4 | 53.641 | 3.01 | | |
| 5 | 45.062 | 7.35 | 1.63636 | 35.4 |
| 6 | −53.161 | 25.98 | | |
| 7 | −16.964 | 2.67 | 1.49200 | 55.0 |
| 8 | −19.364 | | | |

| Aspherical surface: 4 | $\Delta X_4(0.10\,f)/f = 0.3764 \times 10^{-3}$ |
|---|---|
| K = 7.25325D−01 | |
| A1 = −1.31967D−03 | P1 = 2.0000 |
| A2 = 1.74110D−06 | P2 = 4.0000 |
| A3 = 1.34599D−07 | P3 = 5.0000 |
| A4 = −1.34157D−09 | P4 = 6.0000 |
| A5 = −8.89012D−11 | P5 = 7.0000 |
| A6 = −1.89352D−12 | P6 = 8.0000 |
| A7 = −3.00895D−14 | P7 = 9.0000 |
| A8 = −4.23323D−16 | P8 = 10.0000 |
| Aspherical surface: 7 | $\Delta X_7(0.13\,f)/f = 0.1636 \times 10^{-1}$ |
| K = −4.66942D−02 | |
| A1 = −5.79375D−03 | P1 = 2.0000 |
| A2 = 2.65155D−06 | P2 = 4.0000 |
| A3 = 1.40033D−07 | P3 = 5.0000 |
| A4 = −5.61910D−09 | P4 = 6.0000 |
| A5 = −2.07345D−10 | P5 = 7.0000 |
| A6 = −4.54632D−12 | P6 = 8.0000 |
| A7 = −8.25215D−14 | P7 = 9.0000 |
| A8 = −1.34896D−15 | P8 = 10.0000 |
| Aspherical surface: 8 | $\Delta X_8(0.14\,f)/f = 0.3809 \times 10^{-2}$ |

-continued

| f = 100 | W = 35.0° | F 4.0 | |
|---|---|---|---|
| K = −1.34941D+00 | | | |
| A1 = 4.08619D−03 | P1 = 2.0000 | | |
| A2 = −5.98342D−06 | P2 = 4.0000 | | |
| A3 = −1.11390D−07 | P3 = 5.0000 | | |
| A4 = −2.73571D−09 | P4 = 6.0000 | | |
| A5 = −1.87242D−11 | P5 = 7.0000 | | |
| A6 = −7.72103D−12 | P6 = 8.0000 | | |
| A7 = 8.06903D−14 | P7 = 9.0000 | | |
| A8 = 1.21083D−15 | P8 = 10.0000 | | |

$f_{1,3} = 63.97$
$f_4 = -83.42$
$f_B = 41.49$
$\Sigma_D = 52.54$
Telephoto ratio = 0.9403

Embodiment 20

| | f = 100 | W = 35.0° | F 4.0 | |
|---|---|---|---|---|
| | R | D | N | ν |
| 1 | 25.456 | 8.33 | 1.60311 | 60.7 |
| 2 | 51.919 | 3.17 | | |
| 3 | −83.159 | 2.00 | 1.84666 | 23.9 |
| 4 | 53.357 | 3.00 | | |
| 5 | 44.786 | 7.33 | 1.63636 | 35.4 |
| 6 | −52.854 | 25.91 | | |
| 7 | −16.932 | 2.67 | 1.49200 | 55.0 |
| 8 | −19.318 | | | |

| Aspherical surface: 4 | $\Delta X_4(0.10\ f)/f = 0.3797 \times 10^{-3}$ |
|---|---|
| K = 7.27756D−01 | |
| A1 = −1.32518D−03 | P1 = 2.0000 |
| A2 = 1.80317D−06 | P2 = 4.0000 |
| A3 = 1.29636D−07 | P3 = 5.0000 |
| A4 = −1.31328D−09 | P4 = 6.0000 |
| A5 = −8.80417D−11 | P5 = 7.0000 |
| A6 = −1.88673D−12 | P6 = 8.0000 |
| A7 = −3.01311D−14 | P7 = 9.0000 |
| A8 = −4.25894D−16 | P8 = 10.0000 |

| Aspherical surface: 7 | $\Delta X_7(0.13\ f)/f = 0.1915 \times 10^{-1}$ |
|---|---|
| K = −3.21404D−02 | |
| A1 = −6.40550D−03 | P1 = 2.0000 |
| A2 = 2.42588D−06 | P2 = 4.0000 |
| A3 = 1.34860D−07 | P3 = 5.0000 |
| A4 = −5.85913D−09 | P4 = 6.0000 |
| A5 = −2.13561D−10 | P5 = 7.0000 |
| A6 = −4.67139D−12 | P6 = 8.0000 |
| A7 = −8.47291D−14 | P7 = 9.0000 |
| A8 = −1.38483D−15 | P8 = 10.0000 |

| Aspherical surface: 8 | $\Delta X_8(0.14\ f)/f = 0.4093 \times 10^{-2}$ |
|---|---|
| K = −1.33261D+00 | |
| A1 = 3.68391D−03 | P1 = 2.0000 |
| A2 = −5.94307D−06 | P2 = 4.0000 |
| A3 = −1.12697D−07 | P3 = 5.0000 |
| A4 = −2.86277D−09 | P4 = 6.0000 |
| A5 = −2.51163D−11 | P5 = 7.0000 |
| A6 = −8.08864D−12 | P6 = 8.0000 |
| A7 = 7.50480D−14 | P7 = 9.0000 |
| A8 = 1.04768D−15 | P8 = 10.0000 |

$f_{1,2,3} = 63.86$
$f_4 = -82.40$
$f_B = 41.42$
$\Sigma_D = 52.41$
Telephoto ratio = 0.9383

Embodiment 21

| | f = 100 | W = 34.8° | F 4.0 | |
|---|---|---|---|---|
| | R | D | N | ν |
| 1 | 26.201 | 8.34 | 1.60311 | 60.7 |
| 2 | 52.395 | 3.40 | | |
| 3 | −84.495 | 2.04 | 1.84666 | 23.9 |

-continued

| | f = 100 | W = 34.8° | F 4.0 | |
|---|---|---|---|---|
| 4 | 54.121 | 3.06 | | |
| 5 | 46.243 | 7.49 | 1.63636 | 35.4 |
| 6 | −54.233 | 27.48 | | |
| 7 | −17.268 | 2.72 | 1.49200 | 55.0 |
| 8 | −18.407 | | | |

| Aspherical surface: 4 | $\Delta X_4(0.10\ f)/f = 0.3696 \times 10^{-3}$ |
|---|---|
| K = 7.25658D−01 | |
| A1 = −1.83166D−03 | P1 = 2.0000 |
| A2 = 1.65603D−06 | P2 = 4.0000 |
| A3 = 1.26256D−07 | P3 = 5.0000 |
| A4 = −1.16131D−09 | P4 = 6.0000 |
| A5 = −7.85177D−11 | P5 = 7.0000 |
| A6 = −1.65031D−12 | P6 = 8.0000 |
| A7 = −2.58014D−14 | P7 = 9.0000 |
| A8 = −3.56798D−16 | P8 = 10.0000 |

| Aspherical surface: 7 | $\Delta X_7(0.13\ f)/f = 0.2822 \times 10^{-1}$ |
|---|---|
| K = −2.90324D−02 | |
| A1 = −8.22825D−03 | P1 = 2.0000 |
| A2 = 2.11074D−06 | P2 = 4.0000 |
| A3 = 1.16238D−07 | P3 = 5.0000 |
| A4 = −5.37651D−09 | P4 = 6.0000 |
| A5 = −1.89416D−10 | P5 = 7.0000 |
| A6 = −4.04697D−12 | P6 = 8.0000 |
| A7 = −7.18433D−14 | P7 = 9.0000 |
| A8 = −1.15012D−15 | P8 = 10.0000 |

| Aspherical surface: 8 | $\Delta X_8(0.14\ f)/f = 0.5569 \times 10^{-2}$ |
|---|---|
| K = −1.31094D+00 | |
| A1 = 3.70784D−03 | P1 = 2.0000 |
| A2 = −5.84832D−06 | P2 = 4.0000 |
| A3 = −9.85714D−18 | P3 = 5.0000 |
| A4 = −2.50923D−09 | P4 = 6.0000 |
| A5 = −2.16196D−11 | P5 = 7.0000 |
| A6 = −6.97822D−12 | P6 = 8.0000 |
| A7 = 6.37312D−14 | P7 = 9.0000 |
| A8 = 8.77321D−16 | P8 = 10.0000 |

$f_{1,2,3} = 63.48$
$f_4 = -83.56$
$f_B = 39.77$
$\Sigma_D = 54.55$
Telephoto ratio = 0.9432

Embodiments 22 to 32 show examples wherein the third positive lens $L_3$ comprises two positive lenses $L_{31}$ and $L_{32}$.

In Embodiments 31 and 32, both surfaces of the fourth lens $L_4$ have their curvature which is gentler outside the axis than the surface of paraxial radius of curvature. This design is made to make comatic aberration flat at an angle of view of 28° or more. If the object side is greatly displaced, the comatic aberration can be restrained but the image surface curve is short in compensation. Therefore, if the image side is likewise displaced so as to make the curvature gentle outside the axis, the comatic aberration becomes also flat, and the image surface curve can be also compensated.

Embodiment 22

| | f = 100 | W = 35° | F 4.0 | |
|---|---|---|---|---|
| | R | D | N | ν |
| 1 | 23.338 | 8.33 | 1.58913 | 61.0 |
| 2 | 47.542 | 3.23 | | |
| 3 | −63.764 | 1.67 | 1.84666 | 23.9 |
| 4 | 60.832 | 0.81 | | |
| 5 | 92.977 | 2.67 | 1.49200 | 55.0 (resin) |
| 6 | 1212.959 | 0.33 | | |
| 7 | 74.073 | 6.17 | 1.69895 | 30.1 |
| 8 | −48.011 | 21.79 | | |
| 9 | −15.396 | 2.67 | 1.49200 | 55.0 (resin) |
| 10 | −22.856 | | | |

-continued

| f = 100 | W = 35° | F 4.0 |
|---|---|---|

| Aspherical surface: 5 | $\Delta X(0.10 f) = -0.52375 \times 10^{-3}$ |
|---|---|

K = −1.71074D−01
A1 = 4.92612D−05      P1 = 2.0000
A2 = −4.88022D−06     P2 = 4.0000
A3 = −2.39993D−08     P3 = 5.0000
A4 = −7.78213D−10     P4 = 6.0000
A5 = −7.49195D−12     P5 = 7.0000
A6 = −6.60661D−14     P6 = 8.0000
A7 = −5.33783D−16     P7 = 9.0000
A8 = −3.81073D−18     P8 = 10.0000

| Aspherical surface: 9 | $\Delta X(0.13 f) = 0.64918 \times 10^{-2}$ |
|---|---|

K = −2.25565D−01
A1 = −2.76275D−04     P1 = 2.0000
A2 = 5.53218D−07      P2 = 4.0000
A3 = −1.45347D−08     P3 = 5.0000
A4 = −1.98010D−10     P4 = 6.0000
A5 = −3.50886D−12     P5 = 7.0000
A6 = −4.52550D−14     P6 = 8.0000
A7 = −5.55003D−18     P7 = 10.0000

| Aspherical surface: 10 | $\Delta X(0.14 f) = 0.89980 \times 10^{-3}$ |
|---|---|

K = −3.13835D−01
A1 = 2.10215D−03      P1 = 2.0000
A2 = 1.53184D−06      P2 = 4.0000
A3 = −3.92676D−10     P3 = 6.0000
A4 = −7.08901D−13     P4 = 8.0000
A5 = −3.34634D−16     P5 = 10.0000

$f_{123} = 62.49$     $f_4 = -85.84$
$f_B = 46.58$
$\Sigma D = 47.67$     Telephoto ratio = 0.9425

Embodiment 23

| f = 100 | W = 35.0° | F 4.0 | |
|---|---|---|---|
| | R | D | N | ν |
| 1 | 24.659 | 8.33 | 1.69680 | 55.5 |
| 2 | 42.578 | 3.23 | | |
| 3 | −67.819 | 1.67 | 1.84666 | 23.9 |
| 4 | 52.381 | 0.81 | | |
| 5 | 76.727 | 2.67 | 1.49200 | 55.0 (resin) |
| 6 | −575.910 | 0.33 | | |
| 7 | 111.667 | 6.17 | 1.72825 | 28.5 |
| 8 | −55.350 | 21.79 | | |
| 9 | −14.943 | 2.67 | 1.49200 | 55.0 (resin) |
| 10 | −20.160 | | | |

| Aspherical surface: 5 | $\Delta X(0.10 f) = -0.34505 \times 10^{-3}$ |
|---|---|

K = −1.30820D−01
A1 = 3.39173D−03      P1 = 2.0000
A2 = −2.73359D−06     P2 = 4.0000
A3 = 6.23249D−09      P3 = 5.0000
A4 = −2.92059D−10     P4 = 6.0000
A5 = −3.70598D−13     P5 = 7.0000
A6 = 2.94720D−14      P6 = 8.0000
A7 = 6.71573D−16      P7 = 9.0000
A8 = 1.07603D−17      P8 = 10.0000

| Aspherical surface: 9 | $\Delta X(0.13 f) = 0.45674 \times 10^{-2}$ |
|---|---|

K = −1.45031D−01
A1 = 1.52471D−04      P1 = 2.0000
A2 = 1.27500D−06      P2 = 4.0000
A3 = −3.38225D−08     P3 = 5.0000
A4 = −5.54289D−10     P4 = 6.0000
A5 = −7.81470D−12     P5 = 7.0000
A6 = −8.70558D−14     P6 = 8.0000
A7 = −6.64214D−18     P7 = 10.0000

| Aspherical surface: 10 | $\Delta X(0.14 f) = -0.46241 \times 10^{-3}$ |
|---|---|

K = −2.14717D−01
A1 = 3.42646D−03      P1 = 2.0000
A2 = 1.74579D−06      P2 = 4.0000
A3 = 1.44675D−10      P3 = 6.0000
A4 = −8.01771D−13     P4 = 8.0000
A5 = −4.26004D−16     P5 = 10.0000

$f_{123} = 64.58$     $f_4 = -95.16$

-continued

| f = 100 | W = 35.0° | F 4.0 |
|---|---|---|

$f_B = 46.62$
$\Sigma D = 47.67$     Telephoto ratio = 0.9429

Embodiment 24

| f = 100 | W = 35.1° | F 4.0 | |
|---|---|---|---|
| | R | D | N | ν |
| 1 | 24.161 | 8.33 | 1.62041 | 60.3 |
| 2 | 55.286 | 3.23 | | |
| 3 | −72.620 | 1.67 | 1.84666 | 23.9 |
| 4 | 48.792 | 0.81 | | |
| 5 | 56.205 | 2.67 | 1.49200 | 55.0 (RESIN) |
| 6 | 102.794 | 0.33 | | |
| 7 | 60.098 | 6.17 | 1.69895 | 30.1 |
| 8 | −50.252 | 21.84 | | |
| 9 | −16.068 | 2.67 | 1.49200 | 55.0 (resin) |
| 10 | −22.965 | | | |

| Aspherical surface: 6 | $\Delta X(0.10 f) = 0.40965 \times 10^{-3}$ |
|---|---|

K = 4.66658D−02
A1 = 9.94571D−04      P1 = 2.0000
A2 = 3.90452D−06      P2 = 4.0000
A3 = 2.85712D−08      P3 = 5.0000
A4 = −1.57715D−10     P4 = 6.0000
A5 = 2.47038D−12      P5 = 7.0000
A6 = 8.06277D−14      P6 = 8.0000
A7 = 1.45368D−15      P7 = 9.0000
A8 = 2.14475D−17      P8 = 10.0000

| Aspherical surface: 9 | $\Delta X(0.13 f) = -0.23332 \times 10^{-4}$ |
|---|---|

K = 1.37436D−03
A1 = −4.31652D−06     P1 = 2.0000
A2 = 8.26933D−10      P2 = 4.0000
A3 = 1.23673D−11      P3 = 5.0000
A4 = 2.13704D−13      P4 = 6.0000
A5 = 3.51398D−15      P5 = 7.0000
A6 = 5.25111D−17      P6 = 8.0000
A7 = 9.19426D−21      P7 = 10.0000

| Aspherical surface: 10 | $\Delta X(0.14 f) = -0.20773 \times 10^{-2}$ |
|---|---|

K = 9.69262D−02
A1 = 2.57038D−03      P1 = 2.0000
A2 = 5.02112D−07      P2 = 4.0000
A3 = 2.69935D−08      P3 = 5.0000
A4 = −4.21703D−10     P4 = 6.0000
A5 = −7.62587D−12     P5 = 7.0000
A6 = −1.41752D−12     P6 = 8.0000
A7 = −6.48079D−16     P7 = 10.0000

$f_{123} = 64.52$
$f_4 = -93.50$
$f_B = 46.3$
$\Sigma D = 47.72$
Telephoto ratio = 0.9402

Embodiment 25

| f = 100 | W = 35.1° | F 4.0 | |
|---|---|---|---|
| | R | D | N | ν |
| 1 | 23.806 | 8.33 | 1.62041 | 60.3 |
| 2 | 45.147 | 3.23 | | |
| 3 | −68.199 | 1.67 | 1.84666 | 23.9 |
| 4 | 49.314 | 0.81 | | |
| 5 | 80.124 | 2.67 | 1.49200 | 55.0 (resin) |
| 6 | 112.653 | 0.33 | | |
| 7 | 61.164 | 6.17 | 1.69895 | 30.1 |
| 8 | −50.144 | 21.83 | | |
| 9 | −15.946 | 2.67 | 1.49200 | 55.0 (resin) |
| 10 | −21.943 | | | |

| Aspherical surface: 5 | $\Delta X(0.10 f) = -0.58351 \times 10^{-3}$ |
|---|---|

K = −1.59018D−01
A1 = 4.59004D−03      P1 = 2.0000
A2 = −4.54418D−06     P2 = 4.0000
A3 = −1.28609D−08     P3 = 5.0000

-continued

| f = 100 | W = 35.1° | F 4.0 |
|---|---|---|
| A4 = −6.19631D−10 | P4 = 6.0000 | |
| A5 = −4.78023D−12 | P5 = 7.0000 | |
| A6 = −2.04508D−14 | P6 = 8.0000 | |
| A7 = 1.59913D−16 | P7 = 9.0000 | |
| A8 = 5.82337D−18 | P8 = 10.0000 | |

| Aspherical surface: 10 | $\Delta X(0.14\ f) = -0.19630 \times 10^{-2}$ |
|---|---|
| K = −9.03393D−02 | |
| A1 = 4.27902D−03 | P1 = 2.0000 |
| A2 = 6.84180D−07 | P2 = 4.0000 |
| A3 = 2.69934D−08 | P3 = 5.0000 |
| A4 = −4.17368D−10 | P4 = 6.0000 |
| A5 = −7.62582D−12 | P5 = 7.0000 |
| A6 = −1.28071D−12 | P6 = 8.0000 |
| A7 = −6.01368D−16 | P7 = 10.0000 |

$f_{123} = 62.81$  Telephoto ratio = 0.9385
$f_4 = -85.92$
$f_B = 46.14$
$\Sigma D = 47.71$

Embodiment 26

| f = 100 | W = 35.0° | F 4.0 | |
|---|---|---|---|
| | R | D | N | ν |
| 1 | 23.558 | 8.50 | 1.62041 | 60.3 |
| 2 | 50.521 | 3.23 | | |
| 3 | −86.490 | 1.67 | 1.84666 | 23.0 |
| 4 | 46.162 | 0.77 | | |
| 5 | 56.176 | 3.33 | 1.49200 | 55.0 (resin) |
| 6 | 93.231 | 0.33 | | |
| 7 | 61.338 | 5.83 | 1.69895 | 30.1 |
| 8 | −54.756 | 21.96 | | |
| 9 | −15.432 | 3.00 | 1.49200 | 55.0 (resin) |
| 10 | −22.849 | | | |

| Aspherical surface: 5 | $\Delta X(0.10\ f) = -0.50865 \times 10^{-3}$ |
|---|---|
| K = −4.13430D−01 | |
| A1 = 3.07639D−04 | P1 = 2.0000 |
| A2 = −4.38729D−06 | P2 = 4.0000 |
| A3 = −3.04057D−08 | P3 = 5.0000 |
| A4 = −2.37276D−10 | P4 = 6.0000 |
| A5 = 4.02770D−12 | P5 = 7.0000 |
| A6 = 1.18648D−13 | P6 = 8.0000 |
| A7 = 2.04293D−15 | P7 = 9.0000 |
| A8 = 2.92834D−17 | P8 = 10.0000 |

| Aspherical surface: 9 | $\Delta X(0.13\ f) = 0.72242 \times 10^{-2}$ |
|---|---|
| K = −1.00301D−01 | |
| A1 = −1.74270D−03 | P1 = 2.0000 |
| A2 = −9.05943D−07 | P2 = 4.0000 |
| A3 = −4.68770D−08 | P3 = 5.0000 |
| A4 = −5.32538D−10 | P4 = 6.0000 |
| A5 = −2.94270D−12 | P5 = 7.0000 |
| A6 = 2.18312D−14 | P6 = 8.0000 |
| A7 = 1.86221D−17 | P7 = 10.0000 |

$f_{123} = 64.68$  Telephoto ratio = 0.9372
$f_4 = -94.27$
$f_B = 45.1$
$\Sigma D = 48.62$

Embodiment 27

| f = 100 | W = 35.0° | F 4.0 | |
|---|---|---|---|
| | R | D | N | ν |
| 1 | 23.646 | 8.33 | 1.62041 | 60.3 |
| 2 | 48.411 | 3.23 | | |
| 3 | −53.113 | 1.67 | 1.84666 | 23.9 |
| 4 | 43.749 | 0.81 | | |
| 5 | 52.291 | 6.17 | 1.72825 | 28.5 |
| 6 | −48.136 | 0.33 | | |
| 7 | −3793.085 | 2.67 | 1.49200 | 55.0 (resin) |
| 8 | −88.287 | 21.79 | | |
| 9 | −14.473 | 2.67 | 1.49200 | 55.0 (resin) |
| 10 | −19.401 | | | |

| Aspherical surface: 7 | $\Delta X(0.10\ f) = -0.16666 \times 10^{-3}$ |
|---|---|
| K = 4.38921D−06 | |
| A1 = 4.69011D−04 | P1 = 2.0000 |
| A2 = −1.53283D−06 | P2 = 4.0000 |
| A3 = −8.96344D−09 | P3 = 5.0000 |
| A4 = −4.15499D−10 | P4 = 6.0000 |
| A5 = −2.50827D−12 | P5 = 7.0000 |
| A6 = −4.36034D−15 | P6 = 8.0000 |
| A7 = 1.85093D−16 | P7 = 9.0000 |
| A8 = 4.27796D−18 | P8 = 10.0000 |

| Aspherical surface: 9 | $\Delta X(0.13\ f) = 0.12269 \times 10^{-1}$ |
|---|---|
| K = −4.28431D−01 | |
| A1 = 3.80170D−04 | P1 = 2.0000 |
| A2 = 9.76514D−08 | P2 = 4.0000 |
| A3 = −4.42657D−08 | P3 = 5.0000 |
| A4 = −6.77506D−10 | P4 = 6.0000 |
| A5 = −9.33013D−12 | P5 = 7.0000 |
| A6 = −1.06698D−13 | P6 = 8.0000 |
| A7 = −1.09735D−17 | P7 = 10.0000 |

| Aspherical surface: 10 | $\Delta X(0.14\ f) = 0.36386 \times 10^{-2}$ |
|---|---|
| K = −6.44648D−01 | |
| A1 = 2.88343D−03 | P1 = 2.0000 |
| A2 = 9.90432D−07 | P2 = 4.0000 |
| A3 = −5.81352D−10 | P3 = 6.0000 |
| A4 = −8.62134D−13 | P4 = 8.0000 |
| A5 = −3.56286D−16 | P5 = 10.0000 |

$f_{123} = 65.51$
$f_4 = -102.63$
$f_B = 47.88$
$\Sigma D = 47.67$
Telephoto ratio = 0.9555

Embodiment 28

| f = 100 | W = 34.9° | F 4.0 | |
|---|---|---|---|
| | R | D | N | ν |
| 1 | 23.645 | 8.33 | 1.62041 | 60.3 |
| 2 | 46.865 | 3.23 | | |
| 3 | −53.761 | 1.67 | 1.84666 | 23.9 |
| 4 | 45.425 | 0.81 | | |
| 5 | 50.615 | 6.17 | 1.72825 | 28.5 |
| 6 | −49.001 | 0.33 | | |
| 7 | −1752.554 | 2.67 | 1.49200 | 55.0 (resin) |
| 8 | −81.430 | 21.79 | | |
| 9 | −14.538 | 2.67 | 1.49200 | 55.0 (resin) |
| 10 | −19.752 | | | |

| Aspherical surface: 8 | $\Delta X(0.10\ f) = 0.30774 \times 10^{-3}$ |
|---|---|
| K = −1.06071D−01 | |
| A1 = 4.95645D−04 | P1 = 2.0000 |
| A2 = 2.94707D−06 | P2 = 4.0000 |
| A3 = 1.98839D−08 | P3 = 5.0000 |
| A4 = −3.83365D−10 | P4 = 6.0000 |
| A5 = −2.69120D−12 | P5 = 7.0000 |
| A6 = −1.06186D−14 | P6 = 8.0000 |
| A7 = 8.33083D−17 | P7 = 9.0000 |
| A8 = 2.91031D−18 | P8 = 10.0000 |

| Aspherical surface: 9 | $\Delta X(0.13\ f) = 0.10694 \times 10^{-1}$ |
|---|---|
| K = −4.16566D−01 | |
| A1 = 6.79564D−04 | P1 = 2.0000 |
| A2 = 6.75223D−09 | P2 = 4.0000 |
| A3 = −4.41548D−08 | P3 = 5.0000 |
| A4 = −6.63263D−10 | P4 = 6.0000 |
| A5 = −9.01936D−12 | P5 = 7.0000 |
| A6 = −1.01266D−13 | P6 = 8.0000 |
| A7 = −9.57618D−18 | P7 = 10.0000 |

| Aspherical surface: 10 | $\Delta X(0.14\ f) = 0.30538 \times 10^{-2}$ |
|---|---|
| K = −5.83710D−01 | |
| A1 = 2.76906D−03 | P1 = 2.0000 |
| A2 = 1.12684D−06 | P2 = 4.0000 |
| A3 = −5.81019D−10 | P3 = 6.0000 |

-continued

| f = 100 | W = 34.9° | F 4.0 | |
|---|---|---|---|
| A4 = −8.58020D−13 | P4 = 8.0000 | | |
| A5 = −3.54324D−16 | P5 = 10.0000 | | |

$f_{123}$ = 65.72
$f_4$ = −103.36
$f_B$ = 47.79
$\Sigma D$ = 47.67
Telephoto ratio = 0.9546

Embodiment 29

| f = 100 | W = 35.0° | F 4.0 | |
|---|---|---|---|
| | R | D | N | ν |
| 1 | 23.783 | 7.50 | 1.64000 | 60.1 |
| 2 | 43.796 | 3.23 | | |
| 3 | −69.326 | 1.67 | 1.84666 | 23.9 |
| 4 | 60.513 | 0.81 | | |
| 5 | 88.007 | 3.23 | 1.49200 | 55.0 (resin) |
| 6 | 462.164 | 0.33 | | |
| 7 | 63.419 | 6.55 | 1.67270 | 32.1 |
| 8 | −51.648 | 21.90 | | |
| 9 | −15.469 | 2.67 | 1.49200 | 55.0 (resin) |
| 10 | −26.165 | | | |

Aspherical surface: 5   $\Delta X(0.10\ f)/f = -0.4804 \times 10^{-3}$

K = −1.60557D−1
A1 = 6.79397D−04    P1 = 2.0000
A2 = −4.51173D−06   P2 = 4.0000
A3 = −1.25660D−08   P3 = 5.0000
A4 = −5.59313D−10   P4 = 6.0000
A5 = −6.06844D−12   P5 = 7.0000
A6 = 1.44023D−14    P6 = 8.0000
A7 = −3.69172D−16   P7 = 9.0000
A8 = 1.06361D−17    P8 = 10.0000

Aspherical surface: 9   $\Delta X(0.13\ f)/f = 0.50952 \times 10^{-2}$

K = −1.54524D−01
A1 = −4.47392D−04   P1 = 2.0000
A2 = 8.20886D−08    P2 = 4.0000
A3 = −1.90565D−08   P3 = 5.0000
A4 = 6.15469D−10    P4 = 6.0000
A5 = −6.65566D−12   P5 = 7.0000
A6 = 2.95039D−13    P6 = 8.0000
A7 = 4.98060D−17    P7 = 10.0000

$f_{123}$ = 61.50    Telephoto ratio = 0.9388
$f_4$ = −80.92
$f_B$ = 45.99
$\Sigma D$ = 47.89

Embodiment 30

| f = 100 | W = 34.9° | F 4.0 | |
|---|---|---|---|
| | R | D | N | ν |
| 1 | 19.445 | 5.71 | 1.51633 | 64.1 |
| 2 | 44.023 | 2.86 | | |
| 3 | −79.101 | 1.43 | 1.80518 | 25.4 |
| 4 | 87.924 | 4.82 | | |
| 5 | 49.782 | 2.68 | 1.49200 | 55.0 (resin) |
| 6 | 80.350 | 0.33 | | |
| 7 | 64.774 | 5.00 | 1.62004 | 36.3 |
| 8 | −63.214 | 12.52 | | |
| 9 | −14.116 | 2.28 | 1.49200 | 55.0 (resin) |
| 10 | −66.805 | | | |

Aspherical surface: 5   $\Delta X(0.10\ f)/f = -0.14285 \times 10^{-3}$

K = 6.70402D−02
A1 = 1.67251D−03    P1 = 2.0000
A2 = −1.52668D−06   P2 = 4.0000
A3 = 6.66687D−09    P3 = 6.0000
A4 = −1.89122D−12   P4 = 8.0000
A5 = −5.57504D−16   P5 = 10.0000

Aspherical surface: 9   $\Delta X(0.13\ f)/f = 0.27428 \times 10^{-2}$

K = −3.92918D−01
A1 = 2.29154D−03    P1 = 2.0000
A2 = −1.52542D−05   P2 = 4.0000
A3 = −8.70940D−09   P3 = 6.0000
A4 = −4.69354D−12   P4 = 8.0000
A5 = −1.00014D−15   P5 = 10.0000

Aspherical surface: 10   $\Delta X(0.14\ f)/f = 0.90655 \times 10^{-3}$

K = −6.97485D−01
A1 = −7.07438D−03   P1 = 2.0000
A2 = −5.37757D−06   P2 = 4.0000
A3 = 2.28130D−08    P3 = 6.0000
A4 = 1.49788D−12    P4 = 8.0000
A5 = −4.82330D−15   P5 = 10.0000

$f_{123}$ = 50.00    $f_4$ = −56.95    $f_B$ = 54.11
$\Sigma D$ = 37.62   Telephoto ratio = 0.9173

Embodiment 31

| f = 100 | W = 35.1° | F 4.0 | |
|---|---|---|---|
| | R | D | N | ν |
| 1 | 24.380 | 8.12 | 1.60311 | 60.7 |
| 2 | 34.791 | 3.33 | | |
| 3 | −64.815 | 2.00 | 1.84666 | 23.9 |
| 4 | 49.204 | 0.67 | | |
| 5 | 52.157 | 2.27 | 1.49200 | 55.0 (resin) |
| 6 | 66.690 | 0.33 | | |
| 7 | 43.398 | 6.96 | 1.63636 | 35.4 |
| 8 | −45.921 | 25.98 | | |
| 9 | −16.915 | 2.67 | 1.e9200 | 55.0 (resin) |
| 10 | −17.658 | | | |

Aspherical surface: 4   $\Delta X(0.1\ f)/f = 0.6 \times 10^{-3}$

K = 1.21956D+00
A1 = −4.02600D−03   P1 = 2.0000
A2 = 2.63085D−06    P2 = 4.0000
A3 = 1.37595D−07    P3 = 5.0000
A4 = 7.28474D−10    P4 = 6.0000
A5 = −8.86419D−11   P5 = 7.0000
A6 = −1.42475D−12   P6 = 8.0000
A7 = −3.03952D−14   P7 = 9.0000
A8 = −3.36650D−16   P8 = 10.0000

Aspherical surface: 9   $\Delta X(0.13\ f)/f = 0.38 \times 10^{-1}$

K = −3.03103D−02
A1 = −8.48312D−03   P1 = 2.0000
A2 = 2.21494D−06    P2 = 4.0000
A3 = 1.25470D−07    P3 = 5.0000
A4 = −5.97302D−09   P4 = 6.0000
A5 = −2.14538D−10   P5 = 7.0000
A6 = −4.67757D−12   P6 = 8.0000
A7 = −8.47523D−14   P7 = 9.0000
A8 = −1.38487D−15   P8 = 10.0000

Aspherical surface: 10   $\Delta X(0.14\ f)/f = 0.68 \times 10^{-2}$

K = −1.31433D+00
A1 = 3.81387D−03    P1 = 2.0000
A2 = −6.17439D−06   P2 = 4.0000
A3 = −1.06032D−07   P3 = 5.0000
A4 = −2.77079D−09   P4 = 6.0000
A5 = −2.45322D−11   P5 = 7.0000
A6 = −8.06784D−12   P6 = 8.0000
A7 = 7.48805D−14    P7 = 9.0000
A8 = 1.04863D−15    P8 = 10.0000

$f_{123}$ = 63.58
$f_4$ = −85.39
$f_B$ = 43.2
$\Sigma D$ = 52.33
Telephoto ratio = 0.9553

Embodiment 32

| f = 100 | W = 35.0° | F 4.0 | |
|---|---|---|---|
| | R | D | N | ν |

-continued

| | f = 100 | W = 35.0° | F 4.0 | |
|---|---|---|---|---|
| 1 | 24.255 | 7.68 | 1.60311 | 60.7 |
| 2 | 41.928 | 3.33 | | |
| 3 | −67.703 | 2.00 | 1.84666 | 23.9 |
| 4 | 63.787 | 0.67 | | |
| 5 | 57.957 | 2.40 | 1.49200 | 55.0 (resin) |
| 6 | 126.241 | 0.33 | | |
| 7 | 43.362 | 6.46 | 1.63636 | 3.5 |
| 8 | −44.918 | 25.61 | | |
| 9 | −16.909 | 2.67 | 1.49200 | 55.0 (resin) |
| 10 | −17.652 | | | |

| Aspherical surface: 5 | $\Delta X(0.1\ f)/f = 0.89796 \times 10^{-3}$ |
|---|---|
| K = −1.04606D+00 | |
| A1 = −3.71564D−03 | P1 = 2.0000 |
| A2 = −8.24299D−06 | P2 = 4.0000 |
| A3 = −5.76765D−09 | P3 = 6.0000 |
| A4 = −1.10664D−12 | P4 = 8.0000 |
| A5 = −1.69979D−16 | P5 = 10.0000 |

| Aspherical surface: 9 | $\Delta X(0.13\ f)/f = 0.38180 \times 10^{-1}$ |
|---|---|
| K = −3.03103D−02 | |
| A1 = −8.48593D−03 | P1 = 2.0000 |
| A2 = 2.21714D−06 | P2 = 4.0000 |
| A3 = 1.25637D−07 | P3 = 5.0000 |
| A4 = −5.98291D−09 | P4 = 6.0000 |
| A5 = −2.14965D−10 | P5 = 7.0000 |
| A6 = −4.68841D−12 | P6 = 8.0000 |
| A7 = −8.49769D−14 | P7 = 9.0000 |
| A8 = −1.38900D−15 | P8 = 10.0000 |

| Aspherical surface: 10 | $\Delta X(0.14\ f)/f = 0.68046 \times 10^{-2}$ |
|---|---|
| K = −1.31433D+00 | |
| A1 = 3.81513D−03 | P1 = 2.0000 |
| A2 = −6.18052D−06 | P2 = 4.0000 |
| A3 = −1.06172D−07 | P3 = 5.0000 |
| A4 = −2.77537D−09 | P4 = 6.0000 |
| A5 = −2.45810D−11 | P5 = 7.0000 |
| A6 = −8.08655D−12 | P6 = 8.0000 |
| A7 = 7.50790D−14 | P7 = 9.0000 |
| A8 = 1.05176D−15 | P8 = 10.0000 |

$f_{123} = 63.32$
$f_4 = -85.37$
$f_B = 43.74$
$\Sigma D = 51.15$
Telephoto ratio = 0.9489

What is claimed is:

1. A wide angle photographic lens consisting of a front lens unit which comprises, from an object side, a positive first lens, a negative second lens and a positive third lens, and a rear lens unit comprising a negative meniscus lens greatly curved toward an image side, wherein at least one surface of said positive lenses is a first aspheric surface and at least one surface of said rear lens unit is a second aspheric surface, and wherein the following conditions are satisfied:

$$0.45 < f/|f_4| < 2.5,\ f_4 < 0$$

$$1.7 < N_2$$

where
f: combined focal length of the entire lens system
$f_4$: focal length of the rear lens unit
$N_2$: refractive index of a second lens (a negative lens in the front lens unit).

2. The wide angle lens of claim 1 wherein where said first aspheric surface is provided on the object side of said first positive lens, an amount of displacement $\Delta X(\phi)$ due to formation of the aspheric surface satisfies the relationship $$-0.5 \times 10^{-2} < \Delta X(0.13f)/f < -0.1 \times 10^{-4}$$

where $\Delta X(\phi)$ is represented by the following formula:

$$\Delta X(\phi) = \frac{C\phi^2}{1 + \sqrt{1 - (1+k)C^2\phi^2}} + \sum_i A_i \phi^{pi} - \frac{C^*\phi^2}{1 + \sqrt{1 - C^{*2}\phi^2}}$$

$C^* = C + 2A_2$
$\phi$: height from an optical axis.

3. The wide angle lens of claim 1 wherein where said first aspheric surface is provided on the image side of said first positive lens, an amount of displacement $\Delta X(\phi)$ satisfies the relationship:

$$0.1 \times 10^{-4} < \Delta X(0.13f)/f < 0.1 \times 10^{-1}.$$

4. The wide angle lens of claim 1 wherein where said first aspheric surface is provided on the object side of the third positive lens, an amount of displacement $\Delta X(\phi)$ is:

$$-0.5 \times 10^{-2} < \Delta X(0.1f)/f < -0.1 \times 10^{-4}.$$

5. The wide angle lens of claim 1 wherein where said first aspheric surface is provided on the image side of the third positive lens, an amount of displacement $\Delta X(\phi)$ is:

$$0.1 \times 10^{-4} < \Delta X(0.1f)/f < 0.5 \times 10^{-2}.$$

6. The wide angle lens of claim 1 wherein where said second aspheric surface is provided in a concave surface on the object side, an amount of displacement $\Delta X(\phi)$ is:

$$0.5 \times 10^{-3} < \Delta X(0.13f)/f < 0.3.$$

7. The wide angle lens of claim 1 wherein said second aspheric surface is provided in a convex surface on the image side of the fourth negative lens, an amount of displacement $\Delta X(\phi)$ is:

$$0.5 \times 10^{-1} < \Delta X(0.14f)/f < -0.1 \times 10^{-4}.$$

8. The wide angle lens of claim 1 wherein the following relationship is established:

$$1.15 < f/f_{123} < 2.0$$

where $f_{123}$ is the combined focal length of said front lens unit.

9. The wide angle lens of claim 1 wherein the positive third lens consists of a single lens.

10. The wide angle lens of claim 1 wherein the positive third lens consists of a positive- and negative cemented lens.

11. The wide angle lens of claim 1 wherein an additional aspheric surface is formed in addition to said first and second aspheric surfaces, and amounts of displacement $\Delta X(\phi)$ of the front unit and rear unit, respectively, due to formation of aspheric surface are:

for the front unit:

$$0.5 \times 10^{-2} f < \Delta X_1(0.18f) + \Delta X_3(0.1f) + \Delta X_5(0.1f) - \Delta X_2(0.13f) - \Delta X_4(0.1f) - \Delta X_6(0.1f) < -0.1 \times 10^{-4} f$$

and
for the rear unit:

$$0.1 \times 10^{-3} f < \Delta X_7(0.13f) - \Delta X_8(0.14f) < 0.3f$$

$\Delta X_1(\phi)$: amount of displacement on the object side of the first positive lens
$\Delta X_2(\phi)$: amount of displacement on the image side of the first positive lens
$\Delta X_3(\phi)$: amount of displacement on the object side of the second negative lens
$\Delta X_4(\phi)$: amount of displacement on the image side of the second negative lens
$\Delta X_5(\phi)$: amount of displacement on the object side of the third positive lens
$\Delta X_6(\phi)$: amount of displacement on the image side of the third positive lens
$\Delta X_7(\phi)$: amount of displacement on the object side of the rear unit
$\Delta X_8(\phi)$: amount of displacement on the image side of the rear unit.

12. The wide angle lens of claim 11 wherein where the additional aspheric surface is formed on the object side of the second negative lens, an amount of displacement $\Delta X(\phi)$ is:

$$-0.5 \times 10^{-2} < \Delta X(0.1f)/f < -0.1 \times 10^{-4}.$$

13. The wide angle lens of claim 11 wherein where the additional aspheric surface is formed on the image side of the second negative lens, an amount of displacement $\Delta X(\phi)$ is:

$$0.1 \times 10^{-4} < \Delta X(0.1f)/f < 0.5 \times 10^{-2}.$$

14. The wide angle lens of claim 1 wherein the positive third lens consists of two positive lenses.

15. The wide angle lens of claim 14 wherein an additional aspheric surface is formed in addition to said first and second aspheric surfaces, and amounts of displacement $\Delta X(\phi)$ of the front unit and rear unit, respectively, due to formation of an aspheric surface are:

for the front unit:

$$-1.0 \times 10^{-2} f < \Delta X_5(0.1f) \times \Delta X_7(0.1f) - \Delta X_6(0.1f) - \Delta X_8(0.1f) < -0.5 \times 10^{-4} f$$

for the rear unit:

$$0.2 \times 10^{-3} f < \Delta X_9(0.13f) - \Delta X_{10}(0.14f) < 0.3f$$

where
$\Delta X_5(\phi)$: amount of displacement of the object surface of a lens on the object side of the third positive lens
$\Delta X_6(\phi)$: amount of displacement of the image surface of a lens on the object side of the third positive lens
$\Delta X_7(\phi)$: amount of displacement of the object surface of a lens on the image side of the third positive lens
$\Delta X_8(\phi)$: amount of displacement of the image surface of a lens on the image side of the third positive lens
$\Delta X_9(\phi)$: amount of displacement of the object surface of the rear unit
$\Delta X_{10}(\phi)$: amount of displacement of the imge surface of the rear unit.

16. A wide angle lens consisting of a front unit which comprises, from an object side, a positive first lens, a negative second lens and a positive third lens, and a rear lens unit comprises a negative meniscus lens greatly curved toward an image side, wherein at least one positive lens in the front lens unit and the rear lens unit consists of plastic lenses to prevent variation in focal position due to a variation in temperature.

17. The wide angle lens of claim 16 wherein either at least one of said positive lenses or said rear lens unit includes at least one aspheric surface, and the lens formed with said aspheric surface consists of a plastic lens.

18. The wide angle lens of claim 16 wherein the following relation is established:

$$0.5 < f_{LP}/|f_4| < 5.0$$

wherein $f_{LP}$ is a focal length of the plastic lens in the third positive lens.

* * * * *